US008468756B2

(12) United States Patent
Arguelles

(10) Patent No.: US 8,468,756 B2
(45) Date of Patent: Jun. 25, 2013

(54) PAN TILE ROOFING SYSTEM

(76) Inventor: Daniel Efrain Arguelles, Miami, FL (US)

( * ) Notice: Subject to any disclaimer, the term of this patent is extended or adjusted under 35 U.S.C. 154(b) by 226 days.

(21) Appl. No.: 13/008,648

(22) Filed: Jan. 18, 2011

(65) Prior Publication Data
US 2011/0209421 A1 Sep. 1, 2011

Related U.S. Application Data

(63) Continuation-in-part of application No. 11/788,987, filed on Apr. 23, 2007, now Pat. No. 7,870,700, which is a continuation-in-part of application No. 11/455,346, filed on Jun. 19, 2006, now Pat. No. 7,513,084.

(51) Int. Cl.
*E04D 13/18* (2006.01)

(52) U.S. Cl.
USPC ............................ 52/173.3; 126/621; 136/244

(58) Field of Classification Search
USPC ....... 52/173.1, 173.3; 136/244, 251; 126/621, 126/622, 623
See application file for complete search history.

(56) References Cited

U.S. PATENT DOCUMENTS

| | | | |
|---|---|---|---|
| 511,859 A | 1/1894 | Montross | |
| 540,913 A | 6/1895 | Hille | |
| 544,770 A | 8/1895 | Plympton | |
| 553,321 A | 1/1896 | Taylor | |
| 880,012 A | 2/1908 | Christensen | |
| 1,155,559 A | 10/1915 | Franklin | |
| 1,251,950 A * | 1/1918 | Ames | 52/478 |
| 1,709,376 A | 4/1929 | Shirley | |
| 1,826,082 A | 10/1931 | Mastick | |
| 1,967,764 A * | 7/1934 | Brown | 52/521 |
| 2,035,921 A | 3/1936 | Quinn | |
| 2,039,536 A | 5/1936 | Johnson | |
| 2,079,308 A | 5/1937 | Walton | |
| 2,100,505 A | 11/1937 | Gimeno | |
| 2,160,548 A | 5/1939 | Kawamura | |
| 2,250,482 A | 7/1941 | Harshberger | |
| 2,520,499 A | 8/1950 | Golaz | |
| 2,984,945 A * | 5/1961 | Campbell | 52/478 |
| 3,760,546 A | 9/1973 | Martin et al. | |
| 3,848,383 A | 11/1974 | Wilson et al. | |

(Continued)

FOREIGN PATENT DOCUMENTS

| | | |
|---|---|---|
| FR | 2592673 A1 | 7/1987 |
| GB | 2141157 A | 12/1984 |

(Continued)

*Primary Examiner* — Christine T Cajilig
(74) *Attorney, Agent, or Firm* — Malloy & Malloy, P.L.

(57) ABSTRACT

A pan tile for use in a roofing system and assembly, wherein a plurality of such pan tiles are disposed in confronting, supported relation on an underlying roof support and in underlying, at least partially supporting relation to plurality of overlapping, exteriorly exposed roof tiles, wherein the pan tiles may be structured individually or integrally in longitudinal arrays. The pan tile includes a planar base and two oppositely disposed planar side segments extending outwardly from opposite peripheries of said base at a common, preferred obtuse angle. Leading and trailing ends of pan tiles have a greater and lesser transverse dimension respectively, wherein the side segments or oriented in a converging configuration extending from the leading end to the trailing end of the pan tile. Solar energy systems may also be incorporated in the individual pan tiles and/or the longitudinal arrays thereof. The roofing assembly may further include a heat dissipating assembly and/or a stabilizing assembly.

15 Claims, 15 Drawing Sheets

U.S. PATENT DOCUMENTS

| | | | |
|---|---|---|---|
| 3,899,855 A | | 8/1975 | Gadsby |
| 4,028,450 A | | 6/1977 | Gould |
| 4,299,201 A | * | 11/1981 | Tsubota .................. 126/622 |
| 4,336,793 A | * | 6/1982 | Ahearn et al. ............ 126/621 |
| 4,470,406 A | | 9/1984 | Rinklake et al. |
| 4,544,595 A | | 10/1985 | Tomason |
| 4,716,701 A | | 1/1988 | Talbot |
| 4,800,675 A | | 1/1989 | Feil et al. |
| 4,932,184 A | | 6/1990 | Waller |
| 5,215,805 A | | 6/1993 | Pavia, Jr. |
| 5,392,584 A | | 2/1995 | Perez-Wilson |
| 5,409,549 A | * | 4/1995 | Mori ....................... 136/244 |
| 5,465,547 A | | 11/1995 | Jakel |
| 5,651,226 A | | 7/1997 | Archibald |
| 5,768,831 A | | 6/1998 | Melchior |
| 5,837,363 A | | 11/1998 | Colafati |
| 6,000,393 A | | 12/1999 | Moore |
| 6,125,602 A | | 10/2000 | Freiborg et al. |
| 6,152,377 A | | 11/2000 | Fiedrich |
| 6,182,403 B1 | * | 2/2001 | Mimura et al. ............ 52/173.3 |
| 6,708,463 B2 | | 3/2004 | Chai |
| 6,920,730 B2 | | 7/2005 | Becker et al. |
| 6,948,288 B1 | | 9/2005 | Smith |
| 7,249,443 B2 | | 7/2007 | Faulkner et al. |
| 7,299,591 B2 | * | 11/2007 | Broatch ................... 52/173.3 |
| 7,513,084 B2 | | 4/2009 | Arguelles |
| 7,870,700 B2 | | 1/2011 | Arguelles |
| 8,137,170 B2 | * | 3/2012 | Klement ................... 454/365 |
| 8,196,369 B2 | * | 6/2012 | Pao et al. ................ 52/747.1 |
| 2004/0144060 A1 | | 7/2004 | Becker et al. |
| 2005/0102947 A1 | | 5/2005 | McCaskill et al. |
| 2007/0022692 A1 | | 2/2007 | Friedman et al. |
| 2007/0289242 A1 | | 12/2007 | Arguellas |
| 2007/0289243 A1 | | 12/2007 | Arguelles |
| 2008/0083176 A1 | | 4/2008 | Barsun et al. |
| 2009/0223550 A1 | | 9/2009 | Curtin et al. |
| 2009/0308020 A1 | | 12/2009 | Duke |
| 2010/0024803 A1 | | 2/2010 | Volcan |
| 2010/0064605 A1 | | 3/2010 | Corvaglia et al. |
| 2010/0236542 A1 | | 9/2010 | Pierson et al. |
| 2010/0245403 A1 | | 9/2010 | Wang |
| 2010/0287852 A1 | | 11/2010 | Bortoletto |
| 2011/0094169 A1 | | 4/2011 | Bellavia |

FOREIGN PATENT DOCUMENTS

| | | |
|---|---|---|
| JP | 02016242 A | 1/1990 |
| WO | WO 2007/149369 A1 | 12/2007 |
| WO | WO 2008/020462 A1 | 2/2008 |
| WO | WO 2008/052816 A1 | 5/2008 |
| WO | WO 2009/053813 A2 | 4/2009 |
| WO | WO 2009/053813 A3 | 4/2009 |
| WO | WO 2010/100663 A2 | 9/2010 |
| WO | WO 2010/100663 A3 | 9/2010 |
| WO | WO 2011/030127 A2 | 3/2011 |
| WO | WO 2011/030127 A3 | 3/2011 |
| WO | WO 2011/048565 A1 | 4/2011 |

\* cited by examiner

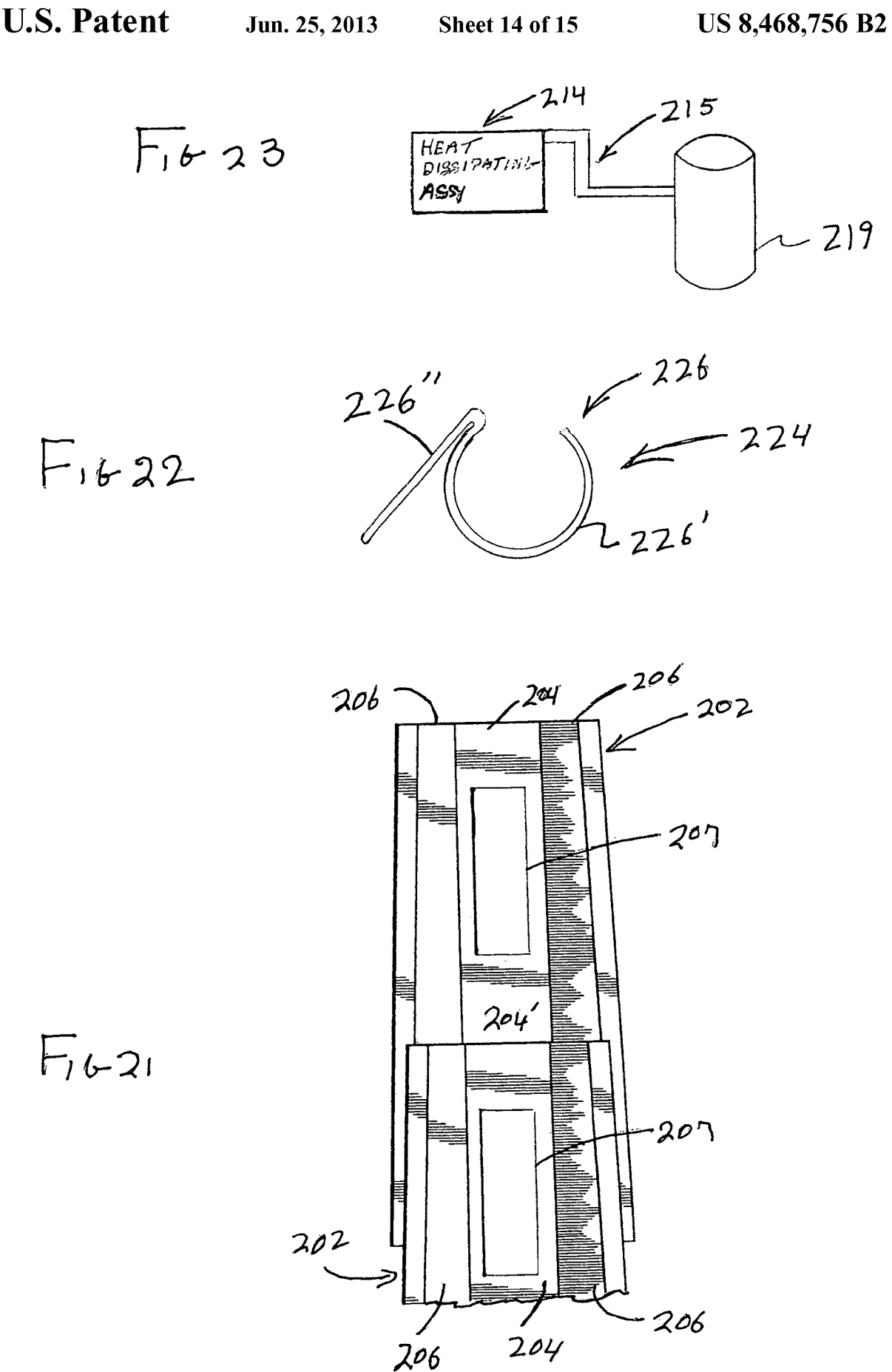

PAN TILE ROOFING SYSTEM

CLAIM OF PRIORITY

The present application is a continuation-in-part application of previously filed, application having Ser. No. 11/788,987, filed on Apr. 23, 2007, which matures into U.S. Pat. No. 7,870,700 on Jan. 18, 2011, which is a continuation-in-part application of previously filed, application having Ser. No. 11/455,346, filed on Jun. 19, 2006, which matured into U.S. Pat. No. 7,513,084 on Apr. 7, 2009 both incorporated herein by reference.

BACKGROUND OF THE INVENTION

1. Field of the Invention

The present invention is directed to a pan tile for use in a roofing system wherein a plurality of pan tiles cover an underlying, supporting roof structure and are collectively oriented to support a plurality of exterior, exposed roof tiles thereon. Each pan tile includes a substantially planar base and oppositely disposed planar side segments cooperatively dimensioned, configured and structured to require a lesser number of both the exposed roof tiles and pan tiles being used to cover a given surface area of the underlying roof structure.

2. Description of the Related Art

In modern day construction, roof covering systems typically include an underlying, supporting deck or like support structure. This underlying support structure is covered by a water proof or leak resistant material that may take various forms. In addition, roofing tiles, shingles and like roof coverings are frequently arranged and secured in overlapping relation to one another so as to collectively overlie the roof deck or like underlying roof support structure. Further, the water resistant covering applied to the outer surface of the roof deck serves to secure the plurality of exterior roof tiles directly to the underlying support. Alternatively, other materials such as cement, polyurethane, "poly-foam", etc. may be utilized to secure or fix an underlying layer of roof tiles, shingles, etc. directly to the outer water resistant layer. As such, a roofing system, as generally described above, facilitates a water resistant roofing assembly as well as an outer or exterior, aesthetically pleasing roof covering.

However, one constant and continuous area of concern is the structure and procedure utilized in the installation of a roofing system specifically including the roofing tiles or like roof covering materials. In typical fashion, roof tiles may include an underlying tile disposed in laterally adjacent relation to one another and arranged in longitudinally adjacent rows or columns, especially when the roofing system is applied to a slanted or sloped roof. Moreover, an outer array of roof tiles are disposed in overlapping, at least partially supported relation on the underlying tiles. As such, the underlying tiles and outer roof tiles make up the exposed covering of the roof deck or like underlying roofing support structure.

In known or conventional roofing systems of the type generally described above, it is recognized in the roofing industry that both time and labor associated with installation, as well as the material cost of both underlying tiles and outer, exposed roof tiles are significant and sometimes prohibitive. These costs are especially high when both the underlying tiles and roof tiles are formed of a highly desirable but relatively expensive ceramic material, which are typically hand made or otherwise manufactured to meet customized specifications.

Accordingly, there is a long recognized need in the roofing industry for a roofing system incorporating roofing materials which reduce the cost and time of installation, as well as reduce the cost of materials a frequently large number of roofing tiles. Such a proposed roofing system should incorporate a pan tile which is dimensioned, configured and structured so as to adequately and effectively cover the underlying roofing support structure while at the same time effectively support the exterior, overlying roof tiles. Moreover, a preferred pan tile could be machine made either from a ceramic or other appropriate material and dimensioned and configured to provide adequate support to the overlying roof tiles. At the same time such a newly proposed pan tile would require a significantly lesser number of both the pan tiles and the conventional roof tiles overlying the improved pan tiles.

Further, the versatility of the proposed pan tile could be such as to serve as an underlying support for a variety of different outer roof tiles specifically including, but not limited to, barrel tiles of the type which are commonly used on domestic dwellings, condominiums and industrial buildings of various styles and designs. Moreover, a roofing system incorporating the preferred and proposed pan tiles of the type described above, should be capable of being secured in overlying relation to the underlying support structure of the roof using any conventional manner including the use of roof installation connectors such as nails, screws, etc or even the more complex connecting wires, clips, or like connectors which facilitate adherence of roofing tiles during extremely high wind conditions. However, when a securing material such as cement, poly-foam, etc. is utilized with a roofing system incorporating a proposed and improved pan tile a significantly lesser amount of such material should be required thereby further increasing the savings in material costs.

SUMMARY OF THE INVENTION

The present invention is directed to a roofing system and more specifically to the structure of a pan tile, wherein a plurality of such pan tiles are dimensioned, configured and structured to be incorporated in a preferred roofing system. In use, a collection of pan tiles cover and confront a roof deck or underlying support structure of a roof and provide efficient support for exterior roof tiles. Moreover, each of the plurality of pan tiles may be produced by a machine and formed from ceramic or in certain preferred embodiments of the present invention, from a fiber glass or other type of appropriate material. The forming of the pan tiles from a fiber glass or other appropriate material has the benefit of a significant reduction in weight while not sacrificing strength or other desirable physical characteristics. The reduction in weight when using a fiber glass pan tile also results in less cost of installation at least to the extent of those costs associated with the transporting of the assemblage of roof tiles to the work site as well as the physically lifting of tiles onto the roof area. While the formation of the pan tiles from fiber glass based material may comprise one preferred embodiment, additional preferred embodiments comprise the inclusion of various types of organic material into the composition of the tile. Moreover, such organic material may be used in combination with appropriate resins such that an organic/resin combination material from which the pan tile is formed facilitates molding of the tile into the desired dimension and configuration.

The structuring of the pan tiles and their collective disposition over the underlying roof support is such as to effectively confront, overlie and protect the underlying support of the roof. At the same time a significantly lesser number of roof tiles are required in providing an aesthetically pleasing exterior, exposed roof covering. Accordingly the present invention is directed to a roofing system which may be produced and installed in a manner which accomplishes a reduction in the cost of material and labor when utilized.

More specifically, each of the pan tiles includes an elongated, substantially planar base, which may vary in dimension, dependent on the particular application of the roofing system with which the preferred pan tiles are utilized. Further, the base of each pan tile comprises oppositely disposed, spaced apart side segments extending angularly outward from the base. Each side segment extends along a different longitudinal periphery of the base and preferably includes a substantially planar shape or configuration. In a most preferred embodiment of the present invention, the side segments extend outwardly at a common, obtuse angle relative to the base. Therefore, the transverse dimension of the base at least partially defines the spacing between the side segments so as to facilitate efficient support of the exterior roof tiles. Accordingly, a greater than normal spacing is provided between the laterally adjacent roof tiles of the roofing system, resulting in less roof tiles being used.

Additional structural features of one or more preferred embodiments of the pan tile include the base preferably having a common transverse dimension along its length. However, the transverse dimensions of the opposite side segments are greater at a leading end of the pan tile and converge, substantially evenly, towards a trailing end of the pan tile. This structuring results in the leading end of the pan tile having an overall greater transverse dimension than the trailing end thereof, while the oppositely disposed side segments collectively comprise a converging configuration as they extend from the leading end to the trailing end of the pan tile.

In addition, in order to provide a preferred and/or predetermined collective array of the exterior, exposed roof tiles, typically in overlapping relation to one another, the leading end of the pan tile has a greater height dimension than the trailing end thereof. Such cooperative dimensioning and configuring of the various components of the pan tile facilitate longitudinally adjacent roof tiles being efficiently arranged in an overlapping relation to one another, as is common with roofing tiles having a barrel-type configuration, as well as other types and styles of pan tiles. Similarly, longitudinally adjacent roof tiles are arranged in rows or columns which are laterally spaced from one another such that the entire underlying support of the roofing structure is covered by the combination of pan tiles and roof tiles.

Accordingly, at least one distinct advantage provided by the unique structuring of the pan tile of the present invention is the ability to utilize a lesser number of the roof tiles, regardless of their style or shape by increasing the lateral spacing between the various rows or columns of longitudinally adjacent overlapping roof tiles. By way of example, in a typical installation of the roofing system of the present invention, a one hundred sq/ft surface area of a roof deck or like underlying roof support structure may typically include approximately 70 pan tiles, disposed in confronting relation with the outer surface of the underlying roof deck and approximately 60 exterior roof tiles disposed in overlying, supported relation on the pan tiles. In comparison, conventional roofing systems of the type incorporating barrel shaped underlying pan tiles and barrel shaped exposed roof tiles would require approximately 80 pan tiles and 80 exterior roof tiles. Therefore, utilizing the roofing system of the present invention would result in savings in material cost as well as installation time and labor through the elimination of approximately 10 pan tiles and 20 of the possibly more expensive exterior roof tiles, over a commonly sized surface area, if a conventional roofing system were utilized. It should be further noted that in known or conventional roofing systems both the pan tiles as well as the roof tiles are frequently hand made or otherwise customized. Proportional savings in the underlying securing material such as polyurethane, cement, poly-foam etc. would also add to the overall savings and efficiency of utilizing a roofing system which incorporated a plurality of pan tile dimensioned, configured and structured in accordance with one or more of the preferred embodiments of the present invention.

The present invention comprises yet another preferred embodiment wherein each or at least the majority of the pan tiles, are formed of a "plastic material". As used herein, the referred to plastic material is capable of forming the pan tiles utilizing conventional or customized molding procedures. In addition, yet another preferred embodiment of the present invention comprises a fixed or preferably integral formation of a plurality of the pan tiles in an elongated, overlapping array. More specifically, the longitudinal array may be at least partially defined by the plurality of fixedly interconnected pan tiles having the trailing end of one pan tile overlapping or overlying the leading end of a next, longitudinally adjacent pan tile in the elongated array. Accordingly, the overlapping array, is described as being part of a roofing system wherein the overlapping array extends from the roof crest downwardly, such as when applied to a slanted roof structure. When practically applied in this manner, the aforementioned overlapping, longitudinal array of fixedly interconnected pan tiles have the aforementioned relative dispositions of the trailing end of at least each intermediate pan tile overlying the leading end of the next pan tile.

Similar to the preferred embodiment described above, the overall structural features of each of these pan tiles may be substantially equivalent to the extent of including an elongated base having a common transverse dimension and being integrally secured to two side segments along the opposite longitudinal peripheries of the base. Further, each of the side segments extend angularly outward from the corresponding periphery of the base at an obtuse angle or other appropriate, predetermined angle. As with the additional preferred embodiments described above, the leading end of each of the pan tiles may include a greater height and transverse dimension than the trailing end thereof. Also, the side segments may be collectively disposed in an at least partially converging orientation as they extend from the leading end towards the trailing end.

Moreover, in at least one embodiment the pan tiles further comprise predetermined surface treatments and/or structures associated with at least an undersurface of the base and possibly an inner surface of the base as well as one or both of the side segments. More specifically, the undersurface of the base may comprise a roughened, irregular surface configuration, which may be more specifically defined by a substantially unfinished undersurface comprising an exposure of the fiber particles or content, such as when the pan tiles are formed from fiber glass or other appropriate "moldable" materials, which may also be accurately described as being at least partially fibrous or particulate, as set forth herein.

In contrast, the surface treatment of the inner surface of the base has a predetermined, irregular surface configuration which may be more specifically defined by a particulate material being applied to or formed in the base. As such, the particulate material is disposed of various particles extending outwardly from the inner surface of the base, thereby defining the aforementioned irregular surface configuration. As will be described in greater detail hereinafter, the particulate material may be in the form of gravel, sand, rock or stone particles, etc. Also, the particulate material may have a much smaller dimensional structure or configuration such as having a granular consistency as is common with smaller, sand particles or the like.

As set forth above, one preferred embodiment of the present invention includes at least some of the plurality of pan tiles of an applied roofing system being formed of a plastic material having structural and operative characteristics which allow the material to be molded. Such plastic material may be in the form of a polymer or like composite material, which may be even more specifically defined as a fiber reinforced polymer. Further, the plastic material from which at least the majority of the pan tiles may be formed may be a glass reinforced plastic, commonly known as "fiber glass" in popular usage.

Yet additional one or more preferred embodiments of the present invention include the provision of a solar energy system incorporated in the one or more pan tiles and/or structural modifications thereof. More specifically, the solar energy system may comprise photovoltaic systems or assemblies structured to convert, at least in terms of a roof covering, sunlight into electricity. Applicable photovoltaic systems are typically made of a semi-conductive material such as silicon. As such, cells of photovoltaic material are put together to form a module and such formulated modules can be grouped together on roofs to form arrays which generate power to the corresponding building.

Generally, there are primarily two types of photovoltaic systems comprising a crystalline (mono and poly) system and an amorphous system. The crystalline system comprises an array of silicon wafers sandwiched between two layers of glass. These panels or other structures are heavy and must be attached to a roof using secure fastening or attachment assemblies including metal brackets, bracing, etc. In contrast the amorphous silicon photovoltaic systems are flexible and light weight and may be used with various roofing components and materials in the form of a thin film. As such, the amorphous silicon photovoltaic systems can be incorporated as a laminate into the various roofing components and are almost unnoticeable when viewing the roof. Both of the above noted types of photovoltaic technologies are generally equal in cost in terms of dollars per installed watt of power. However, more financial incentives are being offered by state authorities for the use of photovoltaic technologies. In addition, the energy policy act of 2005 provides a credit of generally about 30% of expenditures for the purchase of qualified of photovoltaic equipment generally up to a range of approximately $2,000.

Therefore, one or more preferred embodiments of the present invention may include a solar energy system comprising appropriate photovoltaic assemblies incorporated into the pan tile structures. This will result in the production of solar generated energy as an extremely advantageous feature of the present invention. By way of example, various predetermined surfaces of the pan tile may be covered by a thin, flexible film or laminate of the amorphous silicon photovoltaic components. Yet another example may comprise a structural combination of the crystalline photovoltaic technology into various parts of the pan tile of the present invention.

Yet another preferred embodiment of the present invention comprises a roofing assembly which incorporates many of the structural and operative features of the pan tile structures and system as described above and herein. More specifically, the roofing assembly, including its various components, is disposed in supported relation on an underlying support and includes a plurality of exposed roof tiles. The underlying support of the roofing assembly embodiment of this invention may be substantially as set forth above and/or include in certain additional structural modifications such as vegetation including non-combustible, lightweight growth medium material strips.

Moreover, the roofing assembly embodiment of the present invention includes a plurality of pan tiles including a base and two oppositely disposed side segments extending outwardly from the base at a common, obtuse angle or alternatively at other appropriate angles, as also set forth above. The base is disposed in confronting relation to the underlying support and may be preferably disposed in a plurality of vertically oriented, longitudinal arrays or rows arranged at a predetermined spacing from one another. Moreover, the plurality of rows will typically extend vertically from the upper crest or crown of the roof down towards the lower periphery thereof. The predetermined spacing existing between the adjacent rows of the plurality of pan tiles are sufficient to facilitate at least some of the plurality of roof tiles being concurrently disposed in overlying/overlapping relation to correspondingly disposed side segments of adjacent pan tiles which are associated with transversely adjacently ones of the plurality of rows.

In addition, the roofing assembly of the present invention may also include a solar energy system extending between at least some of the plurality of rows, such as in overlying relation to exposed surface portions of the base of the pan tiles associated with the solar energy system. In addition, the versatility of the roofing assembly of the present invention is further demonstrated by defining the solar energy system as an elongated, thin, flexible film, laminate or like structure of amorphous silicon photovoltaic components. As an alternative, the solar energy system may comprise a structural combination of crystalline photovoltaic technology into various parts of the associated pan tile, such as, but not limited to in overlying relation to the exposed surface of the base of the associated plurality of pan tiles. The distinguishing structural features between the crystalline voltaic technology and the flexible, amorphous silicon voltaic components are set forth in detail herein and hereinafter.

Further structural and operative features of the roofing assembly embodiment of the present invention include the provision of a heat dissipating assembly disposed in heat transferring relation to at least a plurality of pan tiles and, as set forth above, in heat transferring relation to the plurality of roof tiles as well as the area of the remainder of the underlying support and roof structure on which the roofing assembly is disposed. In more specific terms, the heat dissipating assembly comprises a conduit assembly having an elongated configuration and structured to define a path of fluid flow or path of travel of a heat dissipating fluid. The elongated conduit assembly may comprise substantially a single elongated conduit assembly or alternatively a plurality of elongated conduit segments connected in fluid communication with one another on an end-to-end basis. Moreover, the heat dissipating fluid may be in the form of water and/or potable water circulating through the length of the conduit assembly in heat absorbing relation to the pan tiles with which the conduit assembly are associated and with the under portion or area of the roofing tiles, as set forth in greater detail hereinafter. Further, the heat dissipating water may also be subsequently collected at a water supply and used domestically or commercially for the hot water needs of the building associated with the roofing assembly of the present invention.

To render the heat dissipating assembly more efficient, the roofing assembly of the present invention also includes a connecting assembly comprising a plurality of clips each formed from a metallic or other efficient heat transferring material. Each of the plurality of clips are disposed to concurrently engage or be connected to the conduit assembly and concurrently be connected to or mounted on associated ones of the plurality of pan tiles. Also in at least one structural modification of the preferred embodiment of the roofing assembly, the pan tiles are formed from a metallic or other efficient heat conductive or heat transferring material. As such, heat collected by the plurality of pan tiles, due to their exposure to the sun, will be effectively transferred through the clips to the conduit assembly and further the heat dissipating fluid or water passing through the conduit assembly. In order to initially facilitate the efficiency of the heat dissipating assembly, the conduit assembly is preferably formed from a "Pex" tubing, which facilitates the absorbing of heat from the pan tiles and/or connecting clips to the heat dissipating fluid passing through the conduit assembly.

Yet additional structural and operative features of the roofing assembly embodiment of the present invention include the provision of a stabilizing assembly. The stabilizing assembly is disposed between adjacently disposed pan tiles of adjacent rows of such pan tiles and may be further positioned to define or determine the predetermined spacing there between. As such, the stabilizing assembly comprises an elongated stabilizing member or plurality of cooperatively disposed or connected member segments connected or positioned in an end-to-end relation to one another. Moreover, different ones of the stabilizing members are disposed between adjacent ones of the plurality of pan tile rows. The transverse dimension of the stabilizing members will be such as to facilitate an appropriate predetermined spacing between the adjacent rows. As such this determination of the predetermined spacing facilitates the placement of the plurality of roof tiles in overlying/overlapping relation to the side segments of transversely adjacent ones of the plurality of pan tiles, as set forth above.

Therefore, the plurality of stabilizing members are disposed in substantially aligned relation beneath corresponding ones of the roof tiles and are thereby disposed and dimensioned to provide a stabilizing at least partially supporting affect on the roofing tiles. Accordingly, the stabilizing assembly provides additional stabilizing characteristics to both the pan tiles and the roofing tiles associated therewith. Such stabilizing characteristics may include the plurality of stabilizing members being connected, mounted or at least partially adhered to the pan tiles and/or under portion of the correspondingly disposed roofing tiles. As a result, the stabilizing members may be associated with an adhering material such as, but not limited to, a poly-foam material. The poly-foam material, which would be disposed in at least partially surrounding and/or engaging relation to the exterior surface of the stabilizing members, would thereby serve to adhere or interconnect the pan tiles, conduit assembly and/or roof tiles. Such a poly-foam or other adhering material would be disposed in the spaces and areas beneath the plurality of roof tiles in at least partially surrounding and/or engaging relation to the stabilizing members, pan tiles and conduit assembly. Accordingly, the exterior surface of the plurality of stabilizing members may also be structured to better contact or interact with the adhering material. In contrast, the positioning of the stabilizing members absent any type of adhering material may also be utilized and still provide stabilizing characteristics to the entire roofing assembly at least comprising the purity of pan tiles and the plurality of roof tiles. Such stabilizing characteristics will prevent or at least significantly restrict a lifting, removal or other damage including impact damage, during adverse weather conditions such as high wind conditions and/or roof repair, installation, etc.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 21 is a top plan view in partial cutaway of structural modifications incorporated within the plurality of pan tiles of the roofing assembly embodiment of the present invention.

FIG. 22 is a cross sectional view one of a plurality of connecting clips associated with a connecting assembly used to position and/or mount the heat dissipating assembly relative to the plurality of pan tiles incorporated within the roofing assembly embodiment of the present invention.

FIG. 23 is a schematic representation of additional structural and operative features incorporated in the roofing assembly embodiment of the present invention.

Like reference numerals refer to like parts throughout the several views of the drawings.

DETAILED DESCRIPTION OF THE PREFERRED EMBODIMENT

Figure 1:
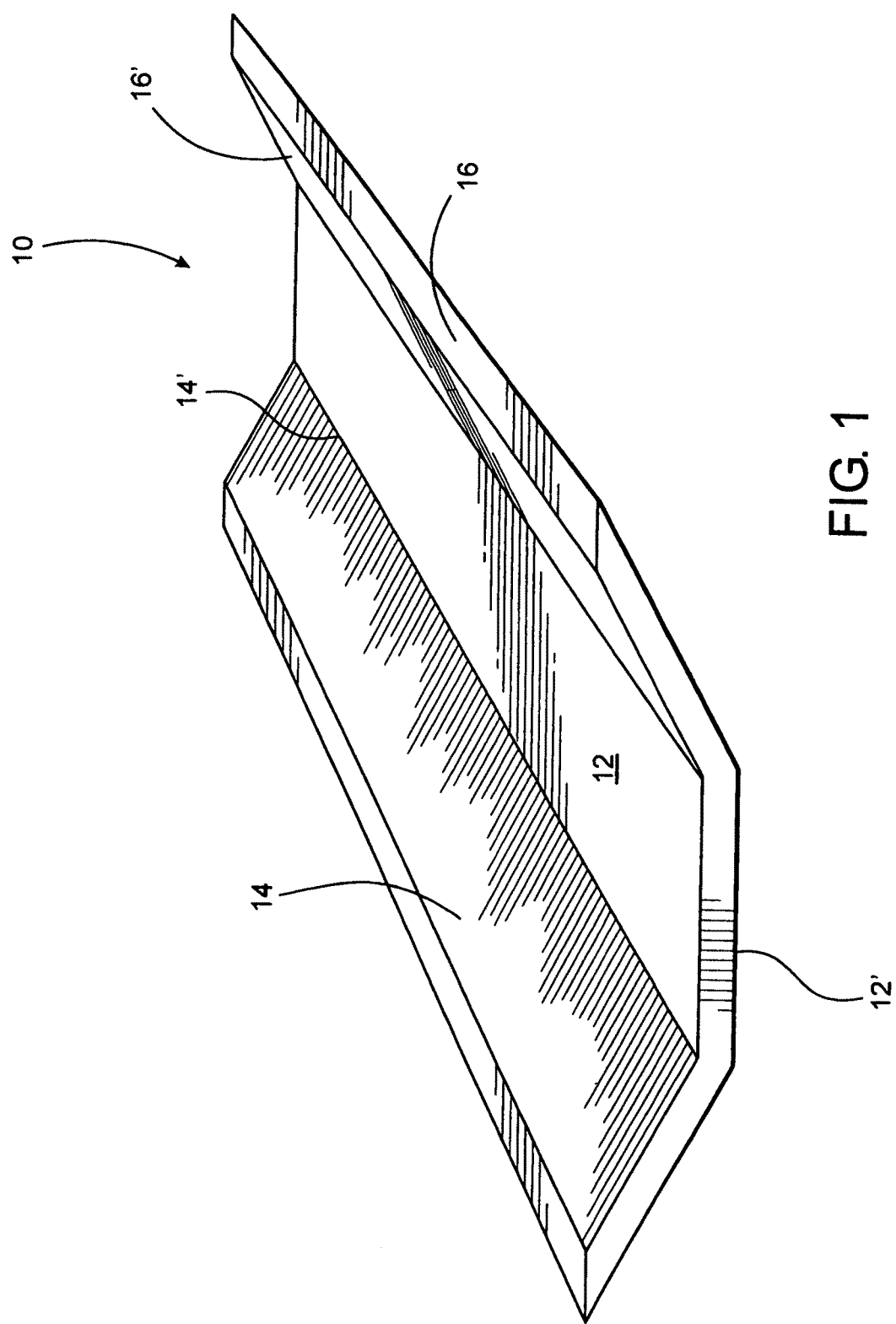
FIG. 1 is a perspective view of one preferred embodiment of a pan tile of the present invention.

The present invention is directed to a pan tile, generally indicated as 10, of the type intended to be used on roofing installations, as well as a roofing system which incorporates a plurality of such pan tiles. As dimensioned, configured and structured the pan tile 10 of the various preferred embodiments of the present invention facilitates the installation of a preferred roofing system and in addition significantly reduces the cost factor of the materials utilized. Therefore the pan tile 10 and roofing system of the present invention overcomes many of the disadvantages and problems associated with known or conventional roofing systems and materials associated therewith.

More specifically, the pan tile 10 of the present invention may be produced or manufactured by a machine, rather than by hand, and may be formed of a ceramic material or other appropriate material which facilitates a reduction in the cost of the plurality of pan tiles utilized. As set forth in greater detail hereinafter, one additional preferred embodiment of the present invention comprises the pan tile being formed of a fiber glass material or other appropriate "moldable" materials including organic materials and/or organic/resin combination materials. Each of these appropriate materials may or may not include preferred surface treatments on predetermined surfaces thereof. Further, the plurality of pan tiles 10 incorporated in a roofing system are structured to facilitate a direct confronting relation with a roof deck 20 or like underlying support and an adhering composition associated therewith. Moreover, the plurality of pan tiles 10 are adaptive for use with a variety of different styles and types of roof tiles such as, but not limited to, barrel tiles 18 which in typical fashion are disposed in overlying relation to the underlying pan tiles. An additional advantage in the utilization of the pan tile 10, based in part on their dimension, configuration and overall structure, is the reduction in the number of the exterior roof tiles 18 which are required for use over a given surface area of the underlying roofing surface 20 being covered.

More specifically, and as represented in the accompanying Figures, at least one preferred embodiment of the pan tile of the present invention is generally indicated as 10 and comprises a base 12 having an elongated configuration and being integrally secured to two side segments 14 and 16. Each of the side segments 14 and 16 preferably extend along the entire length of the base 12 and extend outwardly from opposite peripheral sides or edges 14' and 16' of the base 12 in a predetermined angular orientation. Further, each of the side segments 14 and 16 extend outwardly from the base 12 at a substantially common, obtuse angle so as to facilitate cooperative positioning and support of spaced apart, laterally adjacent roof tiles 18 as clearly represented in FIG. 7, as will be explained in greater detail hereinafter.

Figure 4:
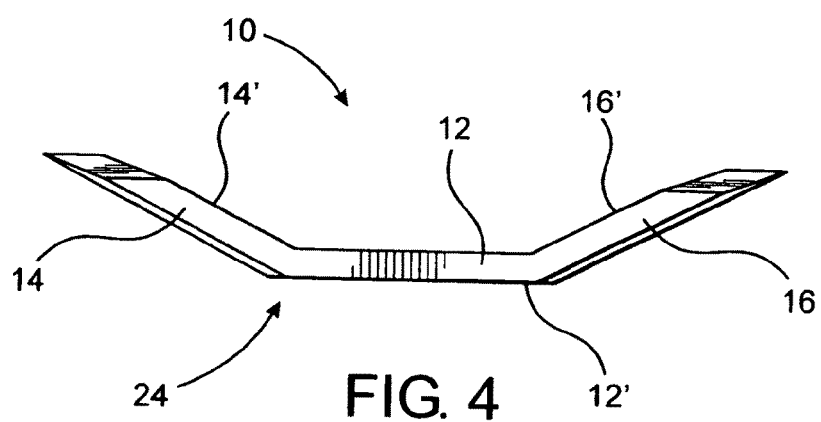
FIG. 4 is an end perspective view of the embodiment of FIGS. 1 and 3.
Figure 5:
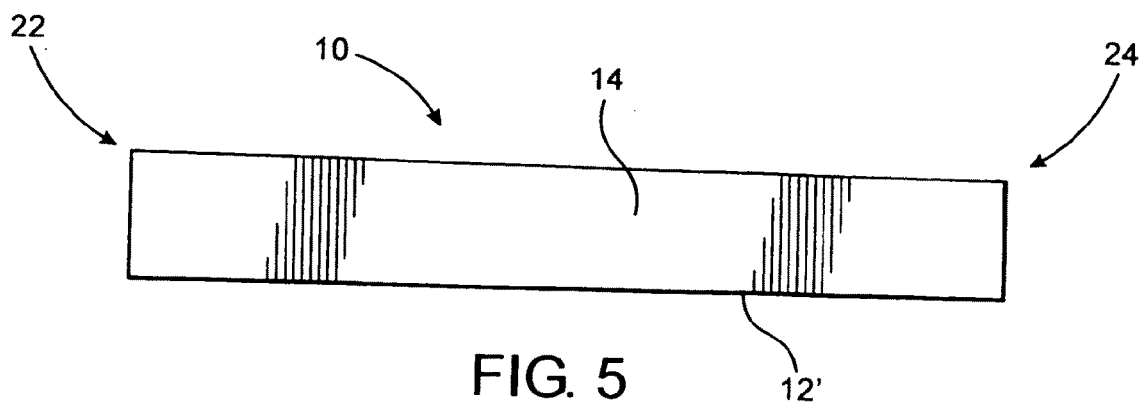
FIG. 5 is a side view of the preferred embodiment of the pan tile as represented in FIGS. 1 and 3.
Figure 6:
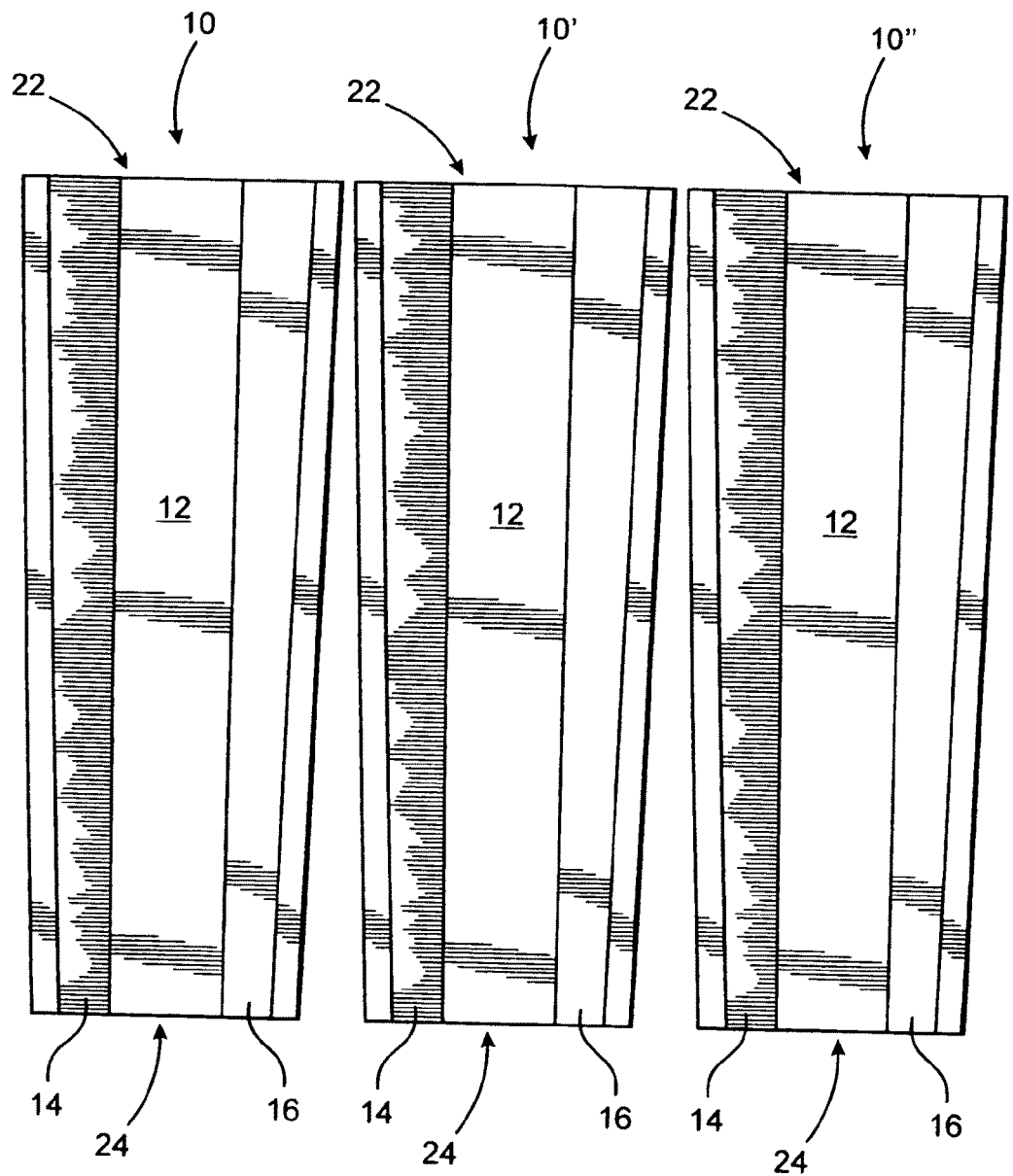
FIG. 6 is a top view of a plurality of pan tiles of the present invention disposed in a predetermined orientation, as practically applied when used in a roofing system.

Additional structural features of each of the pan tiles 10 include the side segments 14 and 16 collectively comprising a substantially converging configuration, as the side segments 14 and 16 of each pan tile 10 extend from the leading end 22 to and towards the trailing end 24 and preferably along the entire length of the base 12. Accordingly, the leading end 22 of each of the pan tiles 10 comprises a greater height dimension than that of the trailing end 24. Such a variance in height from the leading end 22 to the trailing end 24 is preferably accomplished by a progressively decreasing transverse dimension or height of the side segments 14 and 16 as they extend continuously from the leading end 22 to the trailing end 24, as represented in FIG. 5. Such a variance in the height or transverse dimension of the side segments 14 and 16 is also demonstrated in the opposite end views of FIGS. 3 and 4. Other structural and operative features of at least some of the plurality of pan tiles 10 include the base 12 having a substantially planar configuration being further defined by a substantially flat or planar undersurface, as at 12'. As such, the flat or planar undersurface 12' of each of the pan tiles 10 are disposed in confronting relation to a roof deck or like underlying support structure 20 of the roof. Such confronting engagement or relation is intended to describe and take into consideration the presence of adhering foam, cement or other appropriate securing composition or structure which may be disposed between the pan tiles 10 and the outer surface of the underlying support structure 20. Moreover such a confronting engagement or relation of each of the pan tiles 10 with the underlying support 20 facilitates a stable mounting and/or securing of each of the pan tiles 10. In accordance with the roofing system of the present invention, the plurality of pan tiles 10 are disposed in laterally adjacent relation to one another, as represented in FIG. 6.

Figure 4A:
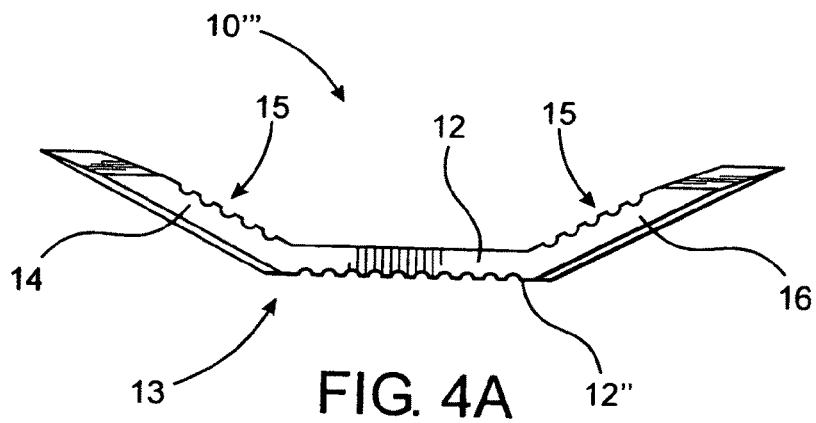
FIG. 4A is an end view in perspective of another preferred embodiment of the pan tile of the present invention similar to but distinguishable from the preferred embodiment of FIGS. 1 and 3.

However, yet another preferred embodiment of the pan tile 10''' of the present invention is represented in FIG. 4A. This embodiment includes a predetermined surface treatment, structurally characterized by a grooved undersurface, generally indicated as 12'', of the base 12. As such, the undersurface comprises a plurality of grooves generally and collectively indicated as 13. The grooves 13 are disposed in at least minimally spaced relation to one another and extend along at least a portion of the length of the undersurface 12''. Also, one or more of the grooves may extend along a majority of the length or along substantially the entire length of the undersurface 12'' of the base 12. The grooves 13 may vary in number, size and overall configuration and may or may not be disposed in a uniform array on the undersurface 12''. One purpose of the grooves 13, which in turn may be at least partially determinative of their number, size, configuration, etc, is the ability to facilitate the adherence of the base 12 to the exposed roof deck or underlying supporting structure 20. Moreover, the existence of the grooves 13 may provide a more secure interconnection or gripping engagement with a foam, cement or other type adhering material which may be disposed between the undersurface 12'' and the exposed exterior surface of the underlying supporting roof structure 20.

As also represented in FIG. 4A the aforementioned surface treatment may be applied to the interior surfaces of the side segments 14 and 16 by including a plurality of elongated, spaced apart grooves generally indicated as 15. As with the plurality of grooves 13, the grooves 15 may vary in number, size, configuration, length, etc. In at least one preferred embodiment represented in FIG. 4A, one or more of the plurality of grooves 15 extend along at least the majority or along substantially the entire length of the inner surface of the side segments 14 and 16. Also, similar to the structure and function of the plurality of grooves 13, the plurality of grooves 15 are provided to better facilitate the securement or connection between a binding or adhering material and the overlying roof tiles 18, wherein the binding, material is generally disposed into and along a length of the space 19 (see FIG. 7) so as to securely fasten or adhere the overlapping roof tiles 18 to the correspondingly positioned side segments 14 and 16 and/or the base 12 of adjacently positioned ones of the pan tiles 18.

Figure 3:
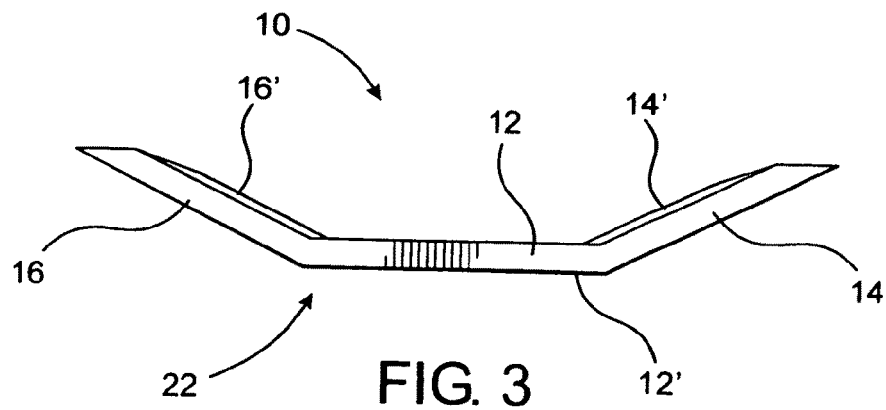
FIG. 3 is an end view of the embodiment of FIG. 1.

It should be further noted that a variation of the preferred embodiment of FIG. 4A may include the plurality of grooves 13 and the plurality of grooves 15, respectively disposed in the undersurface 12" of the base 12 and the inner surfaces of the side segments 13 and 16, being used either independently of one another or in combination with one another. More specifically, there may be practical applications where it is desirable to use the plurality of elongated grooves 13 formed in the undersurface 12" of the base 12, while the plurality of grooves 15 formed in the side segments may not be necessary. Alternatively, there may be additional practical applications wherein the plurality of grooves 15 formed in the inner surfaces of the side segments 14 and 16 are included in the pan tile 10''' and the undersurface of the base 12 is absent the grooves 13 and comprises a flat, planar surface 12', as indicated in FIGS. 3 and 4.

Figure 2:
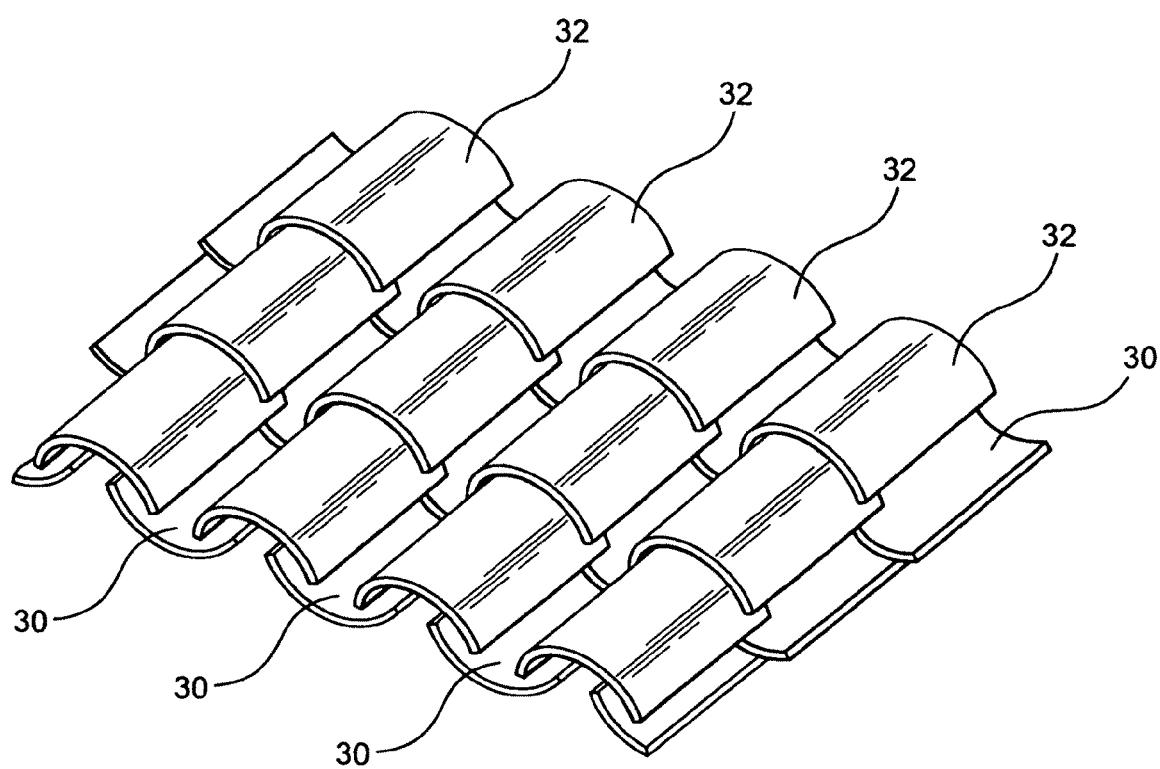
FIG. 2 is a perspective view of a prior art roofing system.

Yet additional structural features of a most preferred embodiment of the present invention comprises each or at least the majority of the pan tiles 10 having a leading end generally indicated as 22 and a trailing end generally indicated as 24. For purposes of clarity the leading end 22 of each of the plurality of pan tiles 10 is disposed substantially "above" the trailing end 24, such as when the plurality of pan tiles 10 are incorporated within a roofing system secured to a sloped or slanted underlying roofing support 20, as is common. Also common to the overall array of both pan tiles and exterior roof tiles is their overlapping orientation or arrangement to longitudinally adjacent tiles, as generally indicated in FIG. 2. As represented in this prior art representation of conventional curved or barrel shaped tiles 30, longitudinally adjacent tiles are disposed in underlying relation to exterior, overlapping roof tiles 32. As such, longitudinally adjacent ones of the pan tiles 30 are disposed in overlapping relation to one another and are disposed beneath or in an underlying relation to overlapping ones of longitudinally adjacent roof tiles 32.

With further regard to the prior art representation of FIG. 2, and as generally set forth above, the use of barrel shaped pan tiles 30 in underlying, supporting engagement to exteriorly exposed roof tiles 32 results in a greater expense in the installation or use in that both the pan tiles 30 and the exposed roof tiles 32 may be hand made or customized and are typically formed from the same ceramic material. Further, the utilization of the curved or barrel shaped pan tile 30 requires a greater number of both the pan tiles 30 and roof tiles 32, which in turn results in a greater material cost as well as an increased labor cost when installing and/or repairing a conventional or prior art roofing system of the type demonstrated in FIG. 2.

Figure 7:
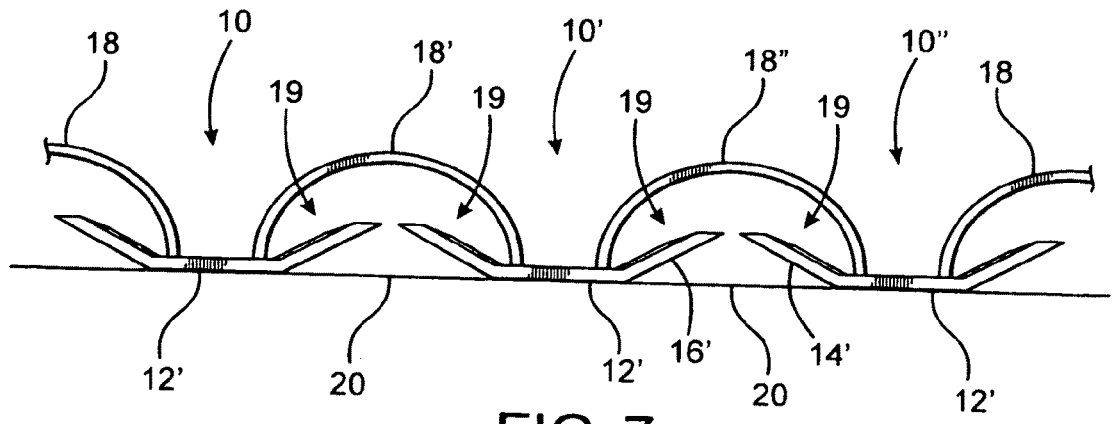
FIG. 7 is an end view of the embodiment of FIG. 6 with a plurality of roof tiles supported on the array of pan tiles.

Also, common terminology used in describing both the conventional roofing system of FIG. 2 and the improved, roofing system incorporating the pan tiles 10 of the present invention both may include the term "longitudinally adjacent" and "laterally adjacent". Accordingly, longitudinally adjacent tiles are those that are arranged in rows or columns extending from a ridge crest of the roof downwardly, wherein laterally adjacent tiles are those that are arranged in adjacent, side-by-side relation to one another. Accordingly, FIGS. 6 and 7 represent a roofing system wherein laterally adjacent tiles 10, 10', and 10" are disposed in side-by-side relation to one another and further wherein laterally adjacent roof tiles 18, 18', 18", etc. are disposed in laterally adjacent but spaced apart relation to one another.

Therefore, additional structuring of the pan tiles 10 which may be incorporated into a roofing system similar to but structurally and operatively distinguishable from the conventional roofing system of FIG. 2, accomplishes the relative overlapping relation between longitudinally adjacent ones of the pan tiles 10 and roof tiles 18 by forming the pan tiles 10 such that the leading end 22 thereof has a greater transverse dimension or width then that of the trailing end 24. Accordingly, the spacing between laterally adjacent pan tiles 10, 10', 10", etc., is represented in FIG. 6. As such, the leading ends 22 have a greater transverse dimension or width and are disposed immediately adjacent and/or in confronting relation to one another. In addition, the trailing ends 24 are orientated at a greater spaced distance from one another than are the leading ends 22. However, as practically applied to the roofing system schematically represented in FIGS. 6 and 7, laterally adjacent pan tiles 10 such as at 10' and 10" are disposed to engage and at least partially support a common roof tile 18". Such engaging support of the roof tile 18" is accomplished by laterally adjacent ones of the pan tiles as at 10' and 10" having correspondingly disposed side segments 16' and 14' being oriented in underlying relation and at least partially on the interior of the commonly supported roof tile 18".

The relative positions and/or orientations of the pan tiles 10, 10', 10", etc. is such that a greater spacing will be created between the laterally adjacent roof tiles 18, 18', 18", etc. due to the overall structure of each of the respective pan tiles 10, 10', 10", having a flat or planar configuration of the respective bases 12. Also additional stability is provided by the confronting relation or engagement of the flat undersurface 12' or the grooved undersurface 12" with the exposed surface portion of the underlying roofing support structure 20. As such, the entire exposed outer surface area of the underlying support 20 will be adequately and appropriately covered by the roofing system as demonstrated in FIG. 7. Also, a significantly lesser amount of cementitious or other type adhering material such as polyurethane, foam, cement, etc. may be utilized to secure the pan tiles 10 or 10''' to the underlying support 20, when such securing or adhering material is utilized. Clearly, other installation techniques and processes may be used to secure the pan tiles 10 to the underlying support 20, as well as secure the roof tiles 18 to the pan tiles 10 to the underlying support 20 and one another.

Yet another preferred embodiment of the present invention is represented in FIGS. 8 through 12 and comprises one or more of a plurality of pan tiles 110 each of which have most of the physical and operative characteristics of the additional preferred embodiments of the present invention as described in FIGS. 1 through 7. More specifically, and with primary reference to FIG. 8, at least the majority of the pan tiles 110 comprise a base 112 having an elongated configuration and being integrally secured to two side segments 114 and 116. Each of the side segments 114 and 116 preferably extend along the entire length of the base 112 and are directed outwardly from opposite peripheral sides or edges, as at 114' and 116', of the base 112 in a predetermined angular orientation. Such an angular orientation is preferably a substantially common, obtuse angle which is determined to facilitate cooperative positioning and support of spaced apart, laterally adjacent roof tiles 18 as described above with reference to FIG. 7 and as additionally represented in FIG. 10.

Figure 8:
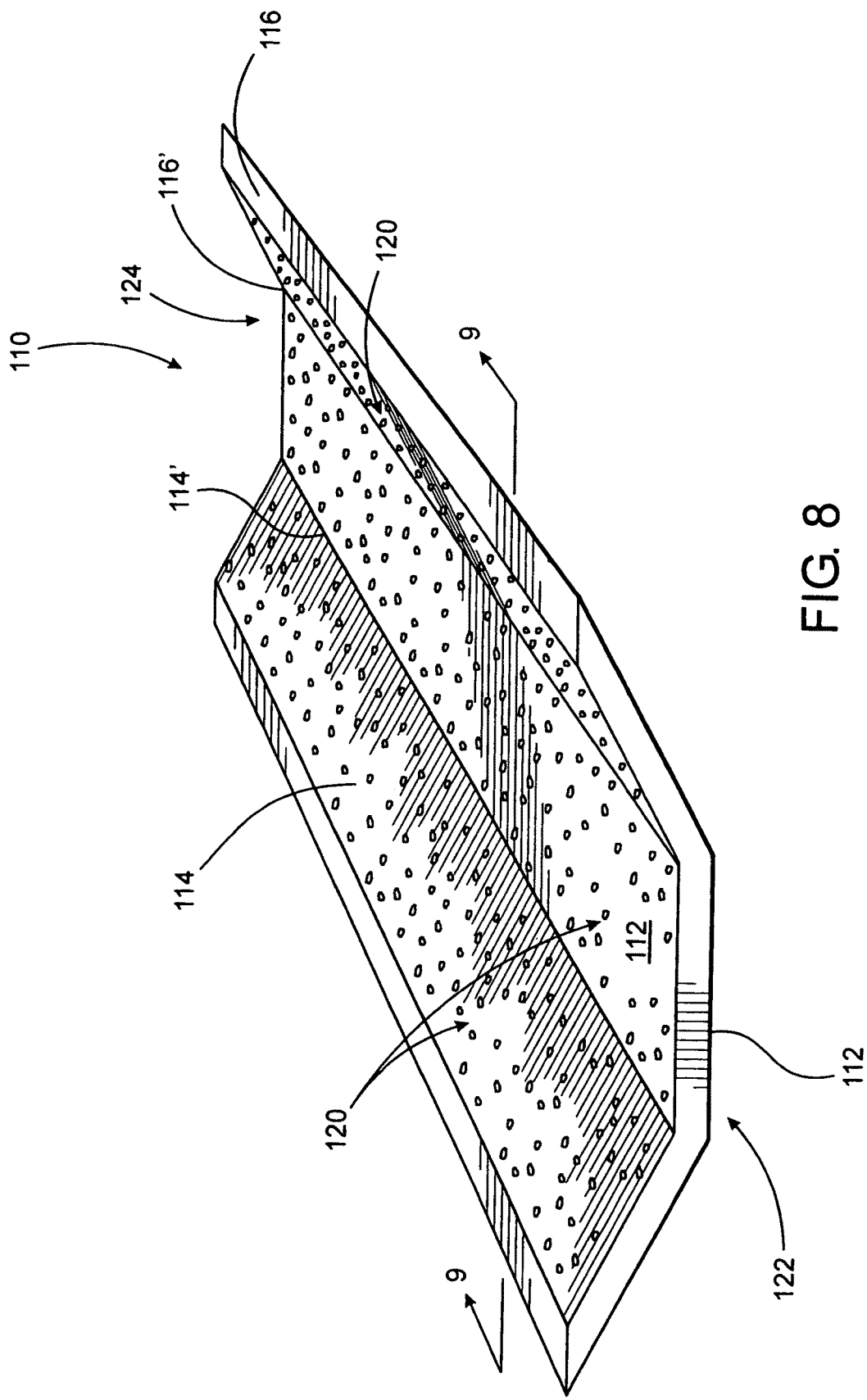
FIG. 8 is a perspective view of an additional preferred embodiment of the pan tile of the present invention.

Similar to the preferred embodiment of FIG. 1, each or at least a majority of the pan tiles 110 include the side segments 114 and 116 collectively comprising a substantially converging configuration, as represented in FIG. 8. Such a converging configuration comprises the side segments 114 and 116 extending from a leading end 122 towards a trailing end 124, of each pan tile 110. In addition, the leading end 122 of each or at least the majority of the plurality of pan tiles 110 includes a greater height dimension than that of the trailing end 124. Such a variance in height between the leading and trailing ends 122 and 124 respectively is accomplished by a progressively decreasing transverse dimension or height of the side segment 114 and 116 as they extend continuously from the leading end 122 to the trailing end 124.

Yet additional structural and operative features of the pan tiles represented in the preferred embodiment of FIG. 8 includes the base 112 having a substantially planar configuration including what may be considered a generally planar under surface, as at 112'. The substantially planar under surface 112' of the pan tiles 110 facilitate the establishment of a confronting relation between each of the pan tiles and an underlying support structure 20 of the roof are on which pan tiles are positioned. Such a "confronting" engagement or relation is intended to describe and take into consideration the presence of a foam, cement or other appropriate securing composition or structure, as at 21, which may be disposed between the under surface 112' of the base 112 and the outer surface of the underlying support structure 20 as clearly represented in FIG. 10. As will be described in greater detail hereinafter, each or at least some of the pan tiles 110 may include predetermined treated surface configuration or structure which facilitates adherence or securement of each of the pan tiles 110 to the underlying support structure 20 and the securing composition 21, as set forth above.

Figure 11:
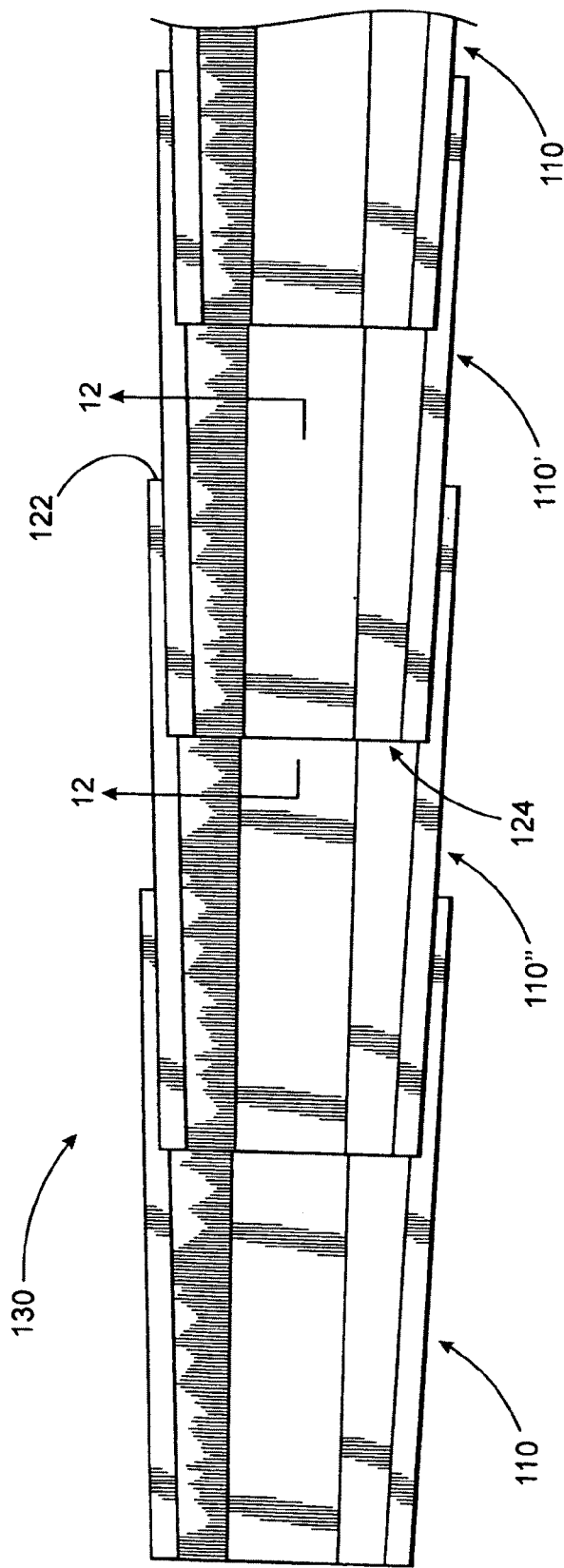
FIG. 11 is a top view of yet another preferred embodiment of the present invention comprising a plurality of the pan tiles of the embodiment of either FIG. 1 or 8 fixedly connected to one another to define a longitudinal array.
Figure 12:
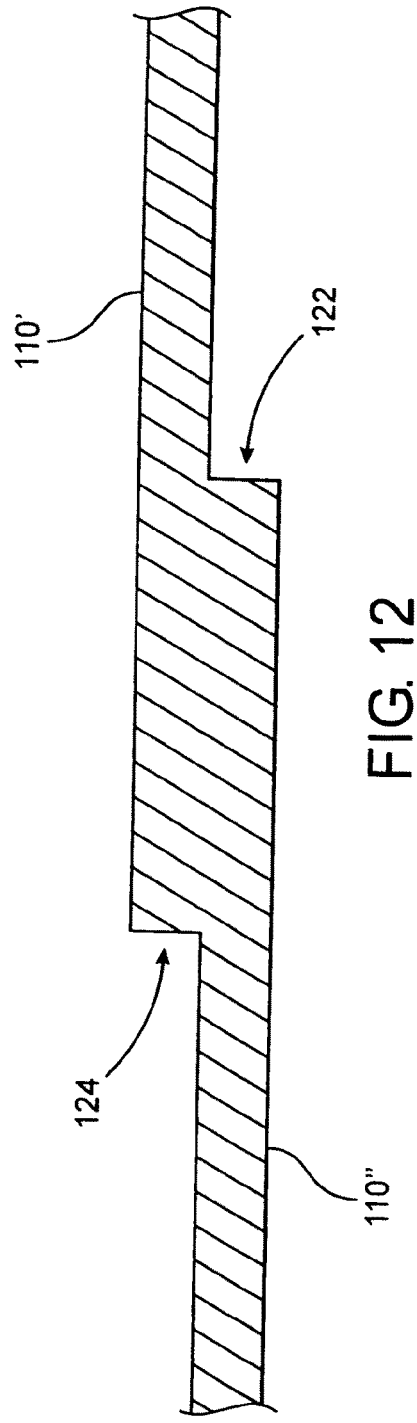
FIG. 12 is a section view in partial cutaway along line 12-12 of FIG. 11.

With primary reference to FIGS. 8, 11 and 12, a structural variation comprising yet another preferred embodiment of the present invention includes each or at least some of the pan tiles 110 formed from a "plastic" material. As used herein the plastic should have performance characteristics which allow the pan tile 10 to be formed using conventional or customized molding procedures, which may be available in the industry. In a most preferred embodiment of the present invention, the plastic material from which a plurality of the pan tiles 110 are formed comprises a fiber reinforce polymer and even more specifically, a glass-reinforce plastic commonly referred to as "fiberglass". When fiberglass or other appropriate plastic materials are utilized in the formation of the plurality of pan tiles 110, additional benefits are provided in the form of strength, flexibility, ultraviolet (UV) protection as well as a variety of other beneficial performance characteristics.

Figure 10:
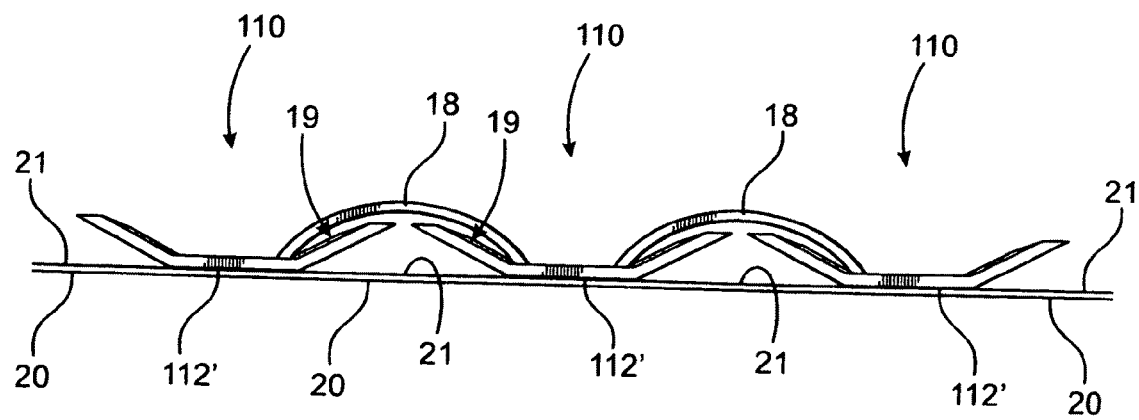
FIG. 10 is an end view similar to the embodiment of FIGS. 7 but incorporating the structural and operative features of the additional preferred embodiment of FIG. 8.

By way of example, when applied in the manner schematically represented in FIG. 10 the plurality of pan tiles 110 are disposed in underlying and at least partially supporting relation to the outer exposed roof tiles 118. The inherent flexibility associated with the fiberglass or other plastic material allows a certain degree of "shock absorbency", such as when individuals walk on the roof structure and/or other force or pressure is applied thereto. As conventionally recognized, if the exposed roof tiles 18 as well as the pan tiles 110 were formed from a clay, ceramic or other conventional material, breakage frequently occurs when a sufficient force or pressure is applied either to the exterior of the exposed roof tiles 18 or directly to the pan tiles 110 themselves. However, the forming of the pan tiles 110 from an appropriate and sufficiently flexible, plastic material, such as fiberglass, reduces such breakage.

As set forth above, the various embodiments of the present invention including individual pan tiles 110 or a linear, longitudinal array 130 of fixedly interconnected ones of such pan tiles can be formed from a variety of materials including ceramic material, fiber glass, other moldable plastic or resin materials and/or an organic based material which may be used independently of or in combination with a resin. Accordingly, in at least one preferred embodiment the materials from which the pan tiles 10, 110 and/or longitudinal array 130 of such pan tiles may be formed should be moldable so as to facilitate the manufacture and production thereof. Further, when fiber glass, organic based and/or organic/resin materials are utilized, sufficient strength is provided to the formed pan tiles while having the additional advantage of significantly reduced weight, which in turn reduces the overall cost factor at least in terms of transportation, installation, etc.

Moreover, and with primary reference to FIGS. 11 and 12, the moldable characteristics of the fiberglass or other plastic material from which the plurality of pan tiles 110 are formed facilitate a fixed interconnection of longitudinally adjacent pan tiles, generally represented as 130 in FIG. 11. This facilitates the formation of a longitudinal or elongated array of fixedly interconnected, overlapping pan tiles 110. Such fixed interconnection may in fact be an integral formation as represented in FIG. 12, wherein the elongated or longitudinal array 130 of FIG. 11 is more specifically defined by corresponding ends of longitudinal adjacent pan tiles 110 being integrally connected in overlapping relation to one another.

The overlapping configuration of the longitudinal array 130 may be more specifically defined by a trailing end 124 of tiles 110' being disposed in overlying relation with a next successive, longitudinally adjacent tile 110". Therefore, the fixed interconnection between the longitudinally adjacent pan tiles 110, etc. may be accomplished by an integral bonding. As such, the plurality of pan tiles 110 defining the overlapping, longitudinal array, as represented in FIG. 11, may be further defined by a unitary, one piece construction comprising the plurality of fixed or integrally interconnected pan tiles. Clearly, the number of pan tiles may vary from two overlapping pan tiles to a much greater number of pan tiles depending upon the specific application for which the pan tiles are utilized and/or various factors associated with the manufacture and/or formation thereof.

Figure 9:
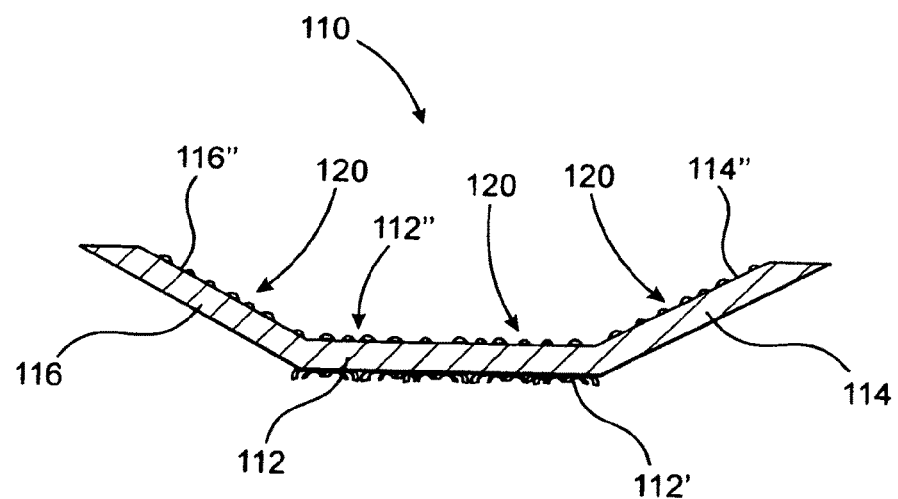
FIG. 9 is a sectional view taken along lines 9-9 of FIG. 8.

With primary reference to FIGS. 8 through 10, yet additional structural and operative features associated with the additional preferred embodiment of the pan tiles 110 includes a predetermined surface treatment thereof. More specifically, as represented in FIGS. 8 and 9 one preferred surface treatment includes the undersurface 112' of the base 112 comprising an irregular surface configuration more specifically defined by a roughened and/or unfinished under surface 112'. Such a roughened or unfinished surface may be further defined by the fiber particles of the fiberglass material from which the pan tiles 110 are formed being exposed rather than being subjected to a smoothing, finishing process. As such, the exposed fiber particles, which may include the reinforcing glass fibers, will further facilitate adherence to the confronting relation and/or engagement of each of the pan tiles 110 with the underlying support structure 20 of the roof on which the plurality of pan tiles 110 are positioned, as schematically represented in FIG. 10. As also set forth above, the confronting relation or engagement of the pan tile 110 is meant to take into consideration the existence or presence of adhering or securing composition 21 in the form foam (poly-foam), cement or any other securing or adhering material which serves to facilitate secure, confronting relation of the plurality of pan tiles 110 to the underlying support structure 20. Therefore, the roughened, irregular or unfinished surface configuration of the undersurface 112' will facilitate such a stable securement to the underlying support structure 20 conventionally, but not necessarily in the presence of the securing or adhering composition 21.

Again with primary reference to FIGS. 8 through 10, an additional variation of the predetermined surface configuration may also be applied to the inner surface 112" of the base 112, as represented in FIG. 9 and/or each or at least one of the inner surfaces 114" and 116" of the side segment 114 and 116. More specifically, the predetermined surface treatment of the base 112 may also include the provision of a particulate material on the inner surface 112" such that the particulate material 120 protrudes at least partially outwardly from the treated inner surface 112" thereby also providing an irregular surface configuration. The particulate material 20 may vary in consistency and composition and as such may comprise sand, gravel, rock particles or particulate material of a variety of different compositions. Further, the individual particle size may vary from a substantially granular consistency to much larger particles, such as rock, stone or other material particles. Similarly, as represented in both FIGS. 8 and 9 at least one of the inner surfaces 114" and/or 116" or both of such inner surfaces of the respective side segments 114 and 116 may also include this predetermined surface treatment comprising the adding of the particulate material 120 to the inner surfaces thereof. Therefore, the various preferred embodiments of the present invention may include predetermined surface treatments to the inner surface 112" of the base 112 in combination with or independent of each of the inner surfaces 114" and 116".

Further, the adding or provision of the particulate material 120 may be accomplished during the molding process of the fiber glass or other appropriate organic or combined organic/plastic materials from which the plurality of pan tiles 110 are formed. In doing so, the particulate material 120 will be integrally formed in the pan tiles 110 so as to extend at least partially outwardly from the specifically indicated surfaces 112" and/or 114" and/or 116". As such, the application of the particulate material 120 to one or more inner surfaces 112", 114" and 116" has the benefit further facilitating the securement or adherence of the roof tiles 18 to the various inner surfaces of the supporting pan tiles 110 as represented in FIG. 10. This adherence may be further enhanced by the inclusion of the aforementioned adhering or securing composition being placed than the spaces 19 or on various other portions of the inner surfaces 112", 114" and/or 116".

Figure 13:
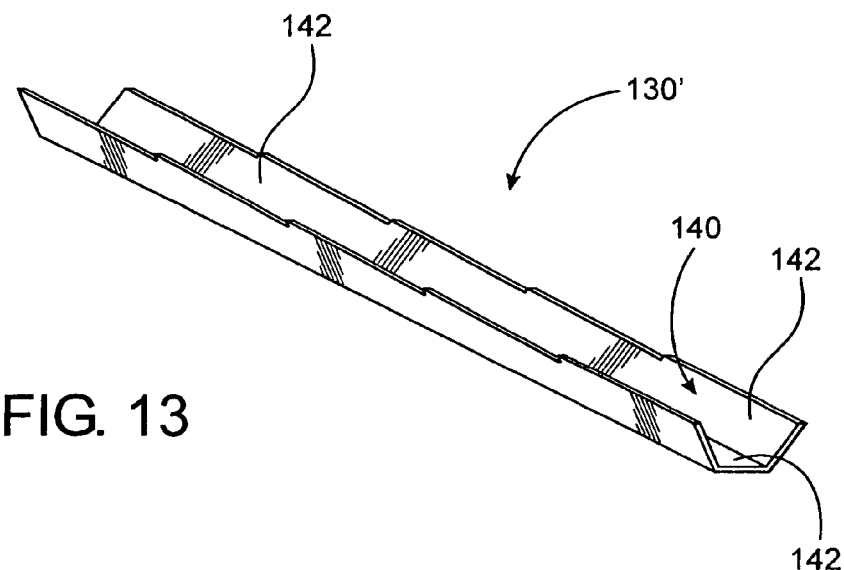
FIG. 13 is a perspective view of yet another preferred embodiment of the present invention similar to the embodiment of FIGS. 11 and 12 and comprising a plurality of pan tiles molded into or otherwise fixedly or integrally connected to one another to define a longitudinal array and including a solar energy system.
Figure 14:
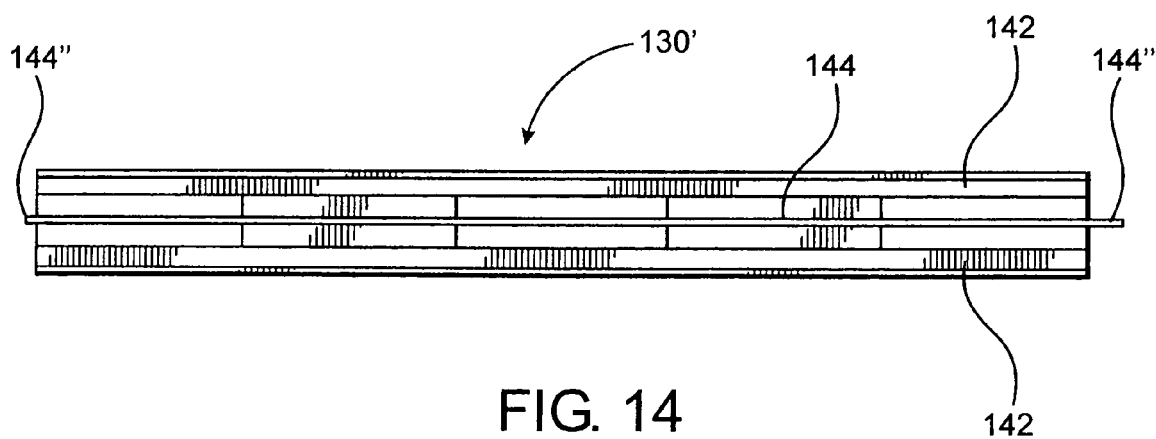
FIG. 14 is a top interior view of the embodiment of Figure
Figure 15:
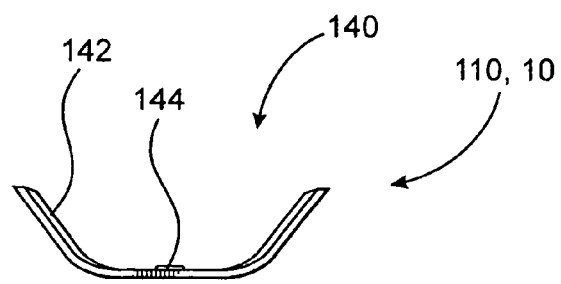
FIG. 15 is a cross sectional view of yet another preferred embodiment of the present invention which further represents the inclusion of a solar energy system incorporated with the pan tile of any one or all of the preferred embodiments of FIGS. 1, 8, 11 and/or 13.

In yet another preferred embodiment, such as that represented in FIGS. 13 through 15, a longitudinal array 130' of pan tiles may be especially conducive to accommodate a solar energy system generally indicated as 140. More specifically, the solar energy system 140 is preferably defined by a photovoltaic system or assembly which is preferably in the form of a thin, flexible film of amorphous photovoltaic material or structure, as described above. While the photovoltaic material film 142 is schematically represented in FIGS. 13-15 it is also emphasized that the solar energy system 140 can be alternatively defined by a crystalline (mono and/or poly) photovoltaic system comprising an array of silicon wafers secured in an appropriate manner to the inner surfaces of the individual pan tiles 110, 10 and/or the longitudinal array 130', as clearly represented.

As also represented in the embodiments of FIG. 14, the solar energy system 140 may also include electrical conductors in the form of strips, panels, conduits, etc. 144, which extend longitudinally along the length of the longitudinal array of fixedly or integrally secured panels 130'. This longitudinal and/or "vertical" orientation of the conductor 144, when the longitudinal arrays 130 are operatively disposed on a pitched roof, have additional advantages in terms of installation and differs from known or conventional solar panel installation assemblies. Moreover, conventional solar panels or like solar energy systems typically include transversely oriented conductors to facilitate an electrical and/or operative interconnection of the photovoltaic structures 142. Further, the schematic representation of FIG. 14, while not showing a specific interconnection of adjacently or cooperatively positioned longitudinal arrays 130' is meant to be indicative of the opposite ends of the electrical conductor 144, as at 144" and 144''', being disposed for operative interconnection with additional and/or adjacent conductors associated with next adjacent or otherwise cooperatively positioned longitudinal arrays 130'. In this manner, continuity over an extended length can be achieved in an aesthetic and easy to implement fashion. Moreover, the solar energy system 140 will achieve a greater integrity, as it will not be subject to possible points of weakness or separation between each and every pan tile.

Figure 16:
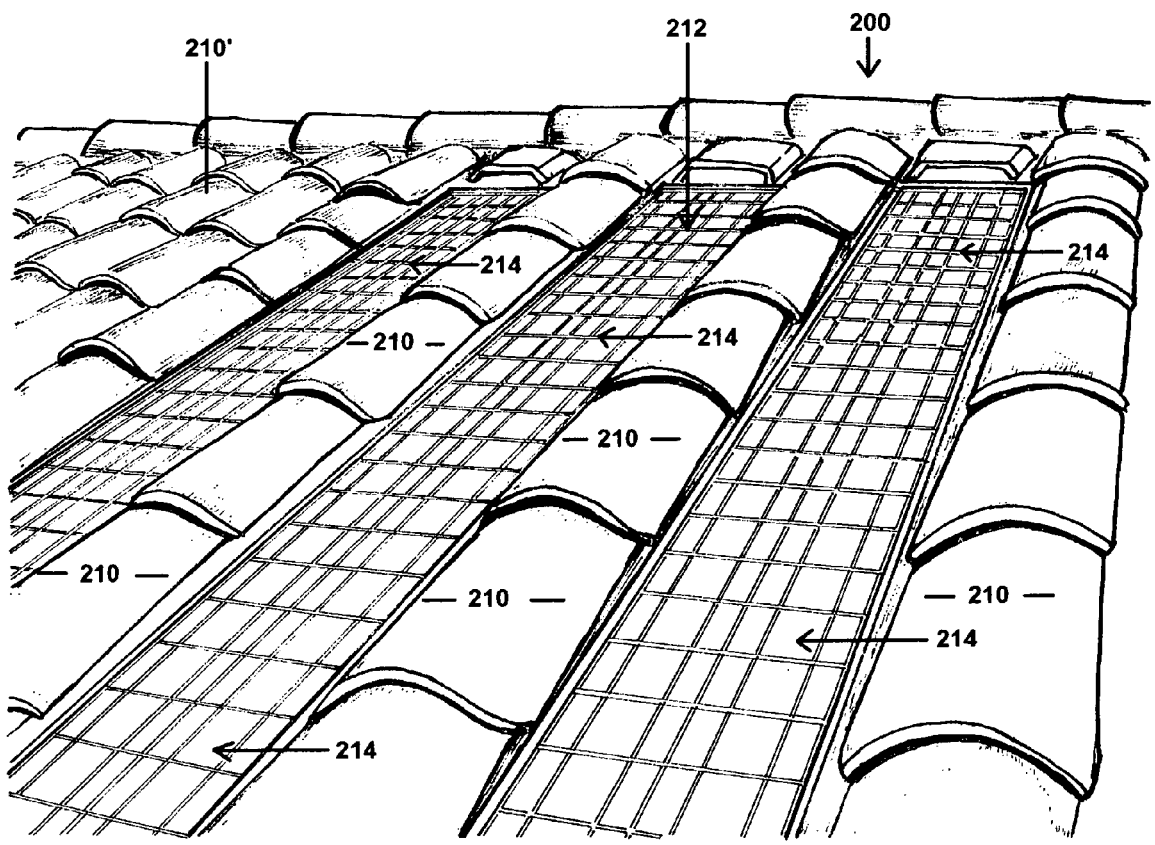
FIG. 16 is a perspective view of yet another preferred embodiment of the present invention directed to a roofing assembly including a plurality of exposed roof tiles as well as a solar energy system.

As represented in FIGS. 16-24, the present invention further includes an additional preferred embodiment directed to a roofing assembly generally indicated as 200 in FIG. 16. As will be apparent, the roofing assembly 200 comprises a plurality of components described in detail with regard to the embodiments of FIGS. 1-15 and incorporates and/or integrates such components so as to provide a complete, versatile, effective and efficient roofing assembly 200.

Figure 17:
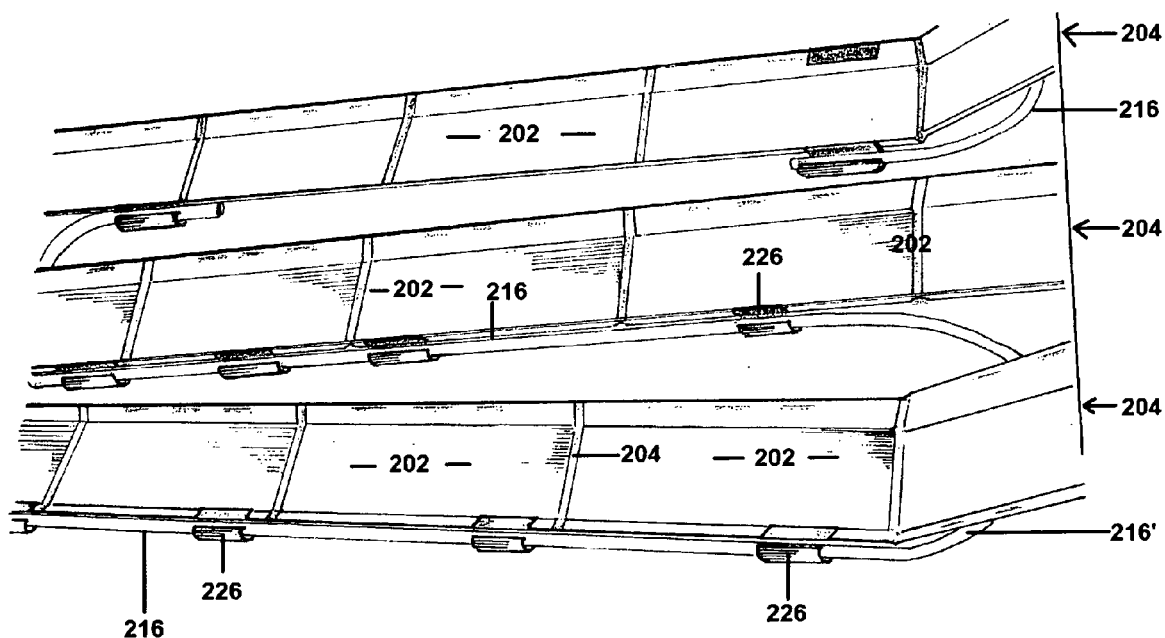
FIG. 17 is a perspective view of a plurality of pan tiles associated with the roofing assembly of the embodiment of FIG. 16 represented in unassembled and uninstalled form and in combination with a heat dissipating assembly.
Figure 18:
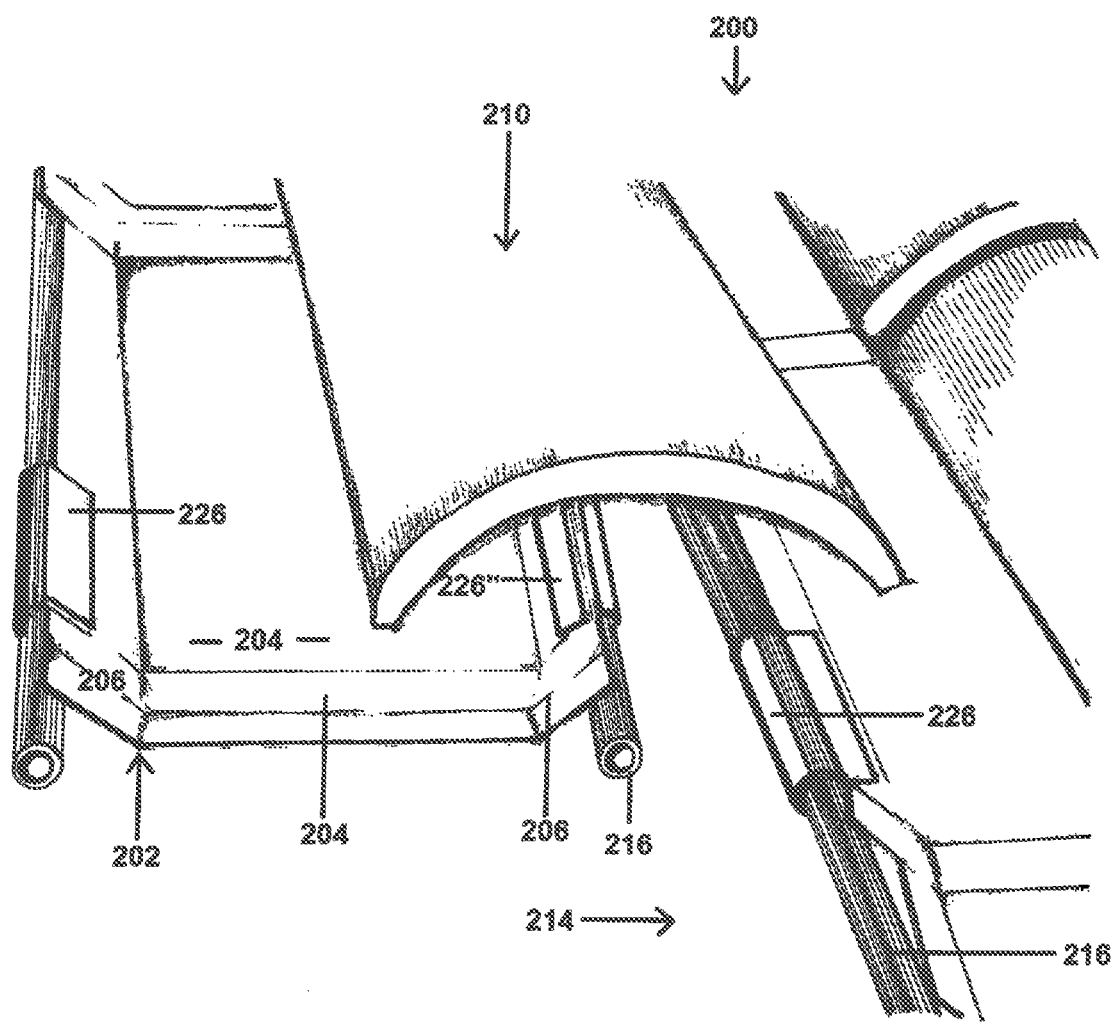
FIG. 18 is a perspective view in partial cutaway of a plurality of structural components included of the embodiment of the roofing assembly as represented in FIGS. 16 and 17.

More specifically, the roofing assembly 200 comprises a plurality of pan tiles 202 which may be disposed in a substantially longitudinally elongated arrays or rows 203 having a predetermined spacing there between. As represented in FIGS. 17, the plurality of pan tiles 202 may be fixedly or integrally connected at their opposite ends to the next, longitudinally adjacent pan tiles, such as at junctions 204. As represented in FIG. 18, each of the pan tiles 202 may include a base 204 and oppositely disposed angularly oriented side segments 206 extending outwardly from the base 204 at an obtuse angle or other predetermined, appropriate angles. In addition, the junction 204 located at the opposite ends of the longitudinally adjacent pan tiles 202 may have a stepped, "channeled" and/or articulated configuration, as will be explained in detail hereinafter. Accordingly, each of the plurality of pan tiles 202 may have the basic structural features of the pan tiles represented in FIGS. 1-15 with the possible exception that in at least some embodiments of the roofing assembly 200, the pan tiles 202 are formed from a metallic and/or other efficient and effective heat conducting or heat transferring material.

As also represented throughout the FIGS. 16-24, the roofing assembly 200 comprises a plurality of exposed roofing tiles 210 disposed in overlapping relation to transversely adjacent and spaced apart ones of the pan tiles 202 which are disposed in spaced apart adjacent rows or longitudinal arrays, as set forth above. However, as clearly demonstrated in FIG. 20 an additional structural and/or operational modification or embodiment of the roofing assembly 200 may also include a solar energy system generally indicated as 212. In the embodiment of FIG. 16, the solar energy system 212 comprises and/or is defined by a photovoltaic system or assembly preferably in the form of a thin, flexible film, laminate or like structure of amorphous, photovoltaic material, including silicon. The solar system 212 is disposed on at least the exposed surface of the base 204 of longitudinally adjacent pan tiles 202, which are disposed in a common longitudinal array or row. Accordingly, the associated plurality of roofing tiles 210 which are associated with the solar energy system 212 are still disposed in overlapping relation to side segments 206 of transversely adjacent pan tiles 202. In addition, the exposed roofing tiles 210' as also represented in FIG. 16 may be associated in overlapping, supported relation with pan tiles 202 having a different or lesser transverse dimension or configuration then those associated with the solar energy system 212. With regard to FIG. 20, the solar energy system 212' may be defined by or comprised of a mono or poly crystalline photovoltaic system which is also disposed in overlying, covering and/or supporting relation to a base 204 of correspondingly disposed pan tiles or groups of pan tiles 202.

Further with regard to the provision of a solar energy system 212, the photovoltaic system may be secured to the exposed surface of the base 204, as at 204' by means of an adhesive structural or material 207, represented in FIG. 21. Such adhesive material or structure may be in the form of a poly-foam material having sufficient adhesive characteristics to maintain the photovoltaic system or structure 212 in its intended location on the exposed surface 204'. Alternatively, the adhesive material or structure 207 may take the form of a double sided adhesive tape or like structure, which may be supplied with the hand tile(s) 202 as installed. In such an instance, the double sided adhesive tape 207 can be quickly and efficiently adhered to the under surface of the photovoltaic system such as at 212 of the embodiment of FIG. 16.

Figure 19:
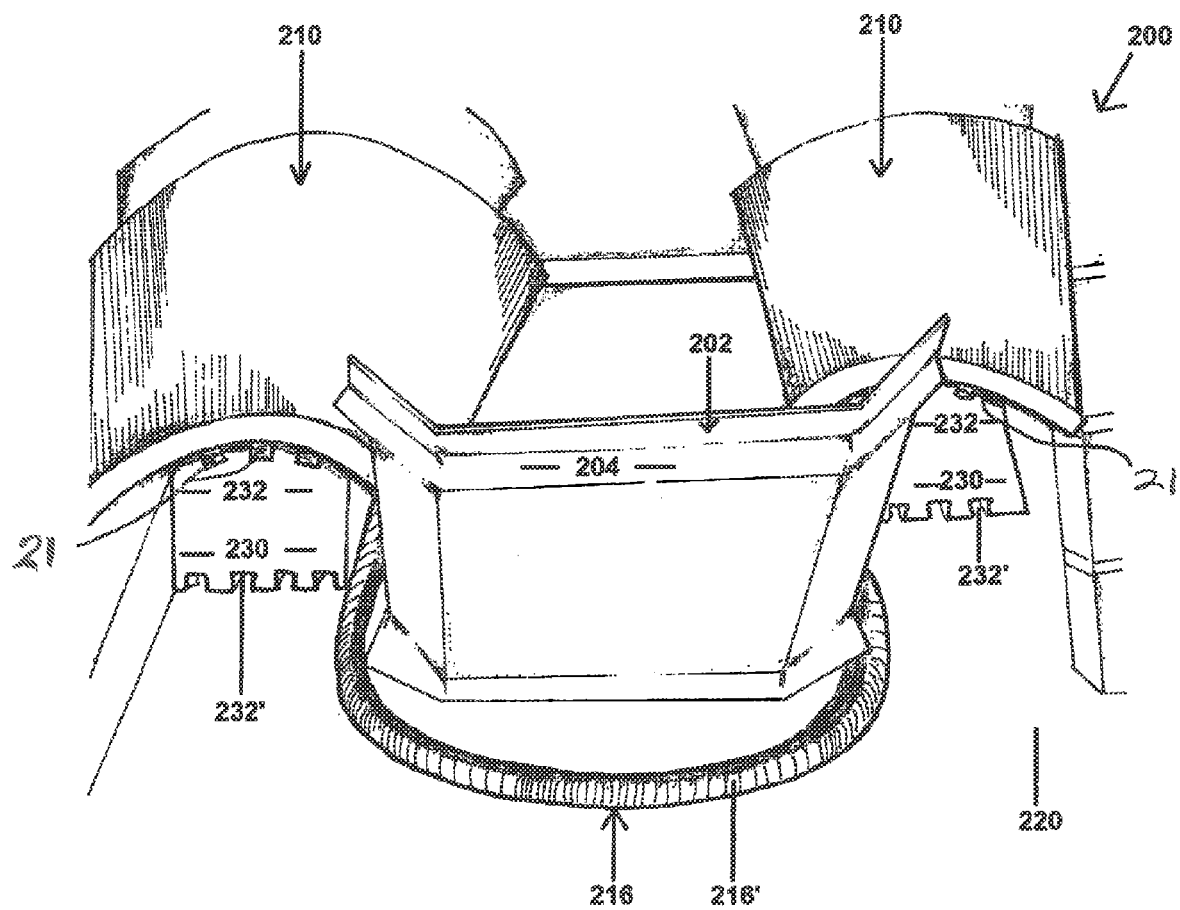
FIG. 19 is a perspective view similar to that of the embodiment of FIG. 18 and showing yet additional structural features and components of the roofing assembly embodiment of the present invention.

Yet additional features of the roofing assembly 200 of the present invention include a heat dissipating assembly generally indicated as 214 in FIGS. 17-19. The heat dissipating assembly 214 includes an elongated conduit assembly 216 defined by an elongated conduit assembly or a plurality of conduit segments interconnected and an end-to-end relation to one another. In either structural modification, the conduit assembly defines a path of fluid flow or path of travel of a heat dissipating fluid. As such, the conduit assembly 216 is disposed in heat conducting relation to a plurality of pan tiles 202 in at least one but preferably each of the plurality of rows defined by the plurality of longitudinally adjacent pan tiles 202. Therefore, as demonstrated in FIG. 17, the conduit assembly 216 extends along the length of the spaced apart rows 203 of pan tiles 202. Further, when the conduit assembly 216 is in a continuous configuration, it may extend transversely under the plurality of pan tiles 202, associated with one row so as to extend along the length of the next transversely adjacent but spaced apart row of pan tiles 202. With primary reference to FIG. 19, the conduit assembly as at 216' indicates that segment of the conduit assembly 216 that extends beneath corresponding ones of the pan tiles 202, as the conduit assembly 216 extends along the length of all or at least a plurality of the rows 203 of the pan tiles 202.

In at least one embodiment, the transverse segment 216' may extend beneath corresponding pan tiles 202 such as at the junction 204. As set forth above, the junction 204 may have a stepped and/or channeled configuration and/or be otherwise articulated so as to facilitate the placement of the transverse segment 216'. It should be further apparent that the disposition of each of the plurality of pan tiles 202 relative to the underlying support 220 should be such as to facilitate the placement of the transverse segment 216' beneath other portions of the corresponding pan tiles 202, other than the junction 204.

With primary reference to FIGS. 17, 18 and 21, the heat dissipating assembly 214 further comprises a connecting assembly, generally indicated as 224. The connecting assembly 224 includes a plurality of elongated clips 226 disposed in spaced relation to one another along the length of the conduit assembly 216 defining the remainder of the heat dissipating assembly 214. As represented in FIG. 22, each of the plurality of clips 226 include a channel shaped portion 226' in which a corresponding portion of the conduit assembly 216 may be placed and retained. In addition, an outwardly extending arm or flange member 226" is disposed and structured to overlap and thereby be connected to a correspondingly disposed side segment 206. It is further emphasized that the plurality of clips 226 are formed from a heat transferring or heat conducting material having sufficient heat conductivity to effectively transfer and/or remove, dissipate, etc. heat from the plurality of pan tiles 202 to which they are attached. Moreover, the "Pex" tubing from which the conduit assembly 216 is formed also facilitate heat transfer from the plurality of clips 226 to the heat dissipating fluid or water flowing through the conduit assembly 216. As a result, heat will be dissipated not only from the plurality of pan tiles 202 but from the area adjacent and between the corresponding pan tile rows 203 as well as the area beneath the exposed roof tiles 210 and the roof tiles themselves.

It is emphasized that the terms "heat conductive" or "heat transferring" is used to describe a material, structure, etc. which has sufficient heat conductive characteristics to serve as an effective "heat sink", at least to the extent of dissipating heat from pan tiles and/or surrounding areas. Accordingly, the pan tiles 202, clips 226, conduit assembly 216 are sufficiently heat conductive to cause the effective and intended degree of heat dissipation through the plurality of clips 226 and conduit assembly 216 and the flowing, circulating heat dissipating fluid or water flowing through the conduit assembly 216.

As a result of the effective operation of the heat dissipating assembly 214, the heat transferred to the heat dissipating fluid, in the form of water, retains sufficient heat to be useful. More specifically, as schematically represented in FIG. 23, the heat dissipating assembly 214 may be disposed, as at 215, in fluid communication with a hot water supply 219 associated with the building or structure on which the roofing assembly 200 is utilized. Therefore, after collection of the heat from the roofing assembly 200, the water may be forced and/or circulated from the heat dissipating assembly 214 through appropriate piping 215 to the hot water supply 219 for use.

Figure 20:
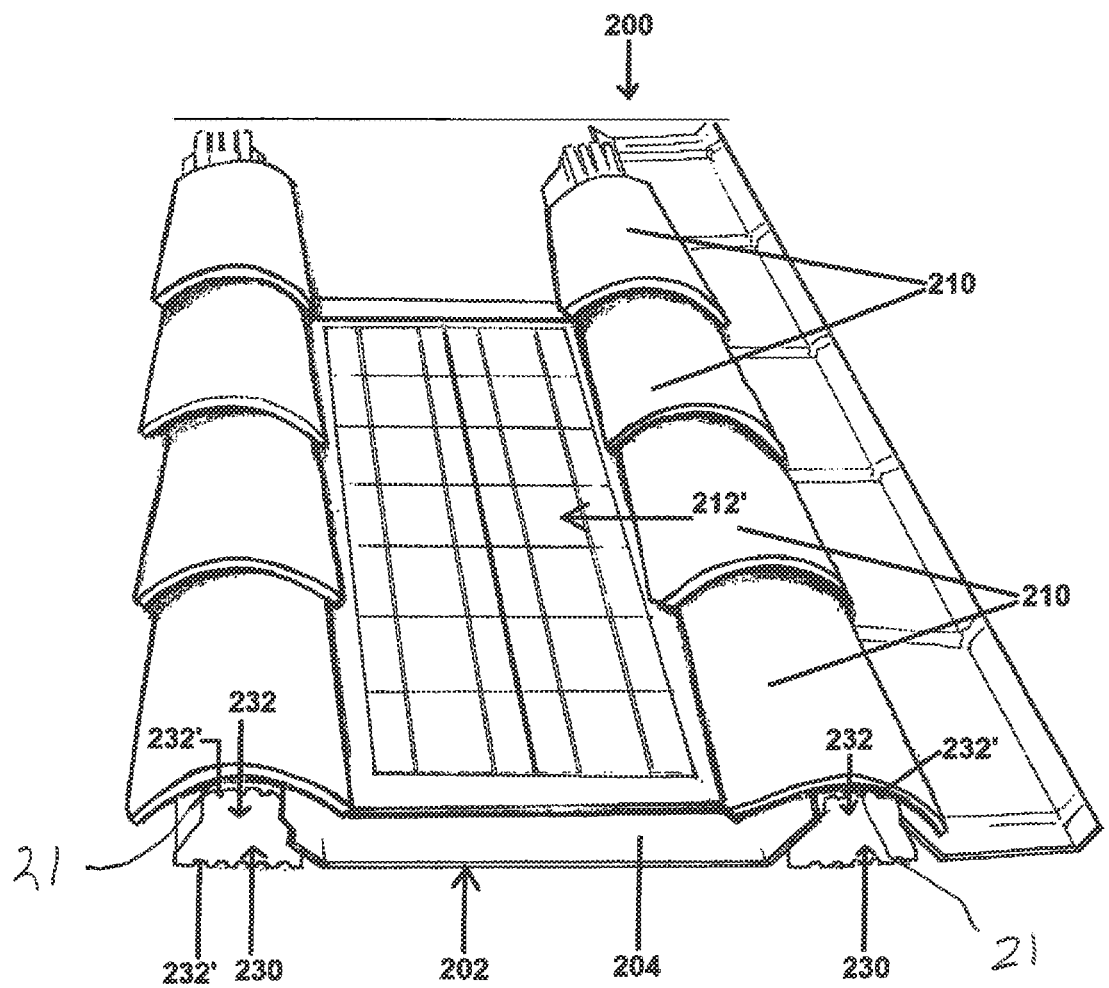
FIG. 20 is a perspective view in partial cutaway of an unassembled portion of the roofing assembly embodiment of the present invention incorporating a different type of solar energy system than that represented in FIG. 16.
Figure 24:
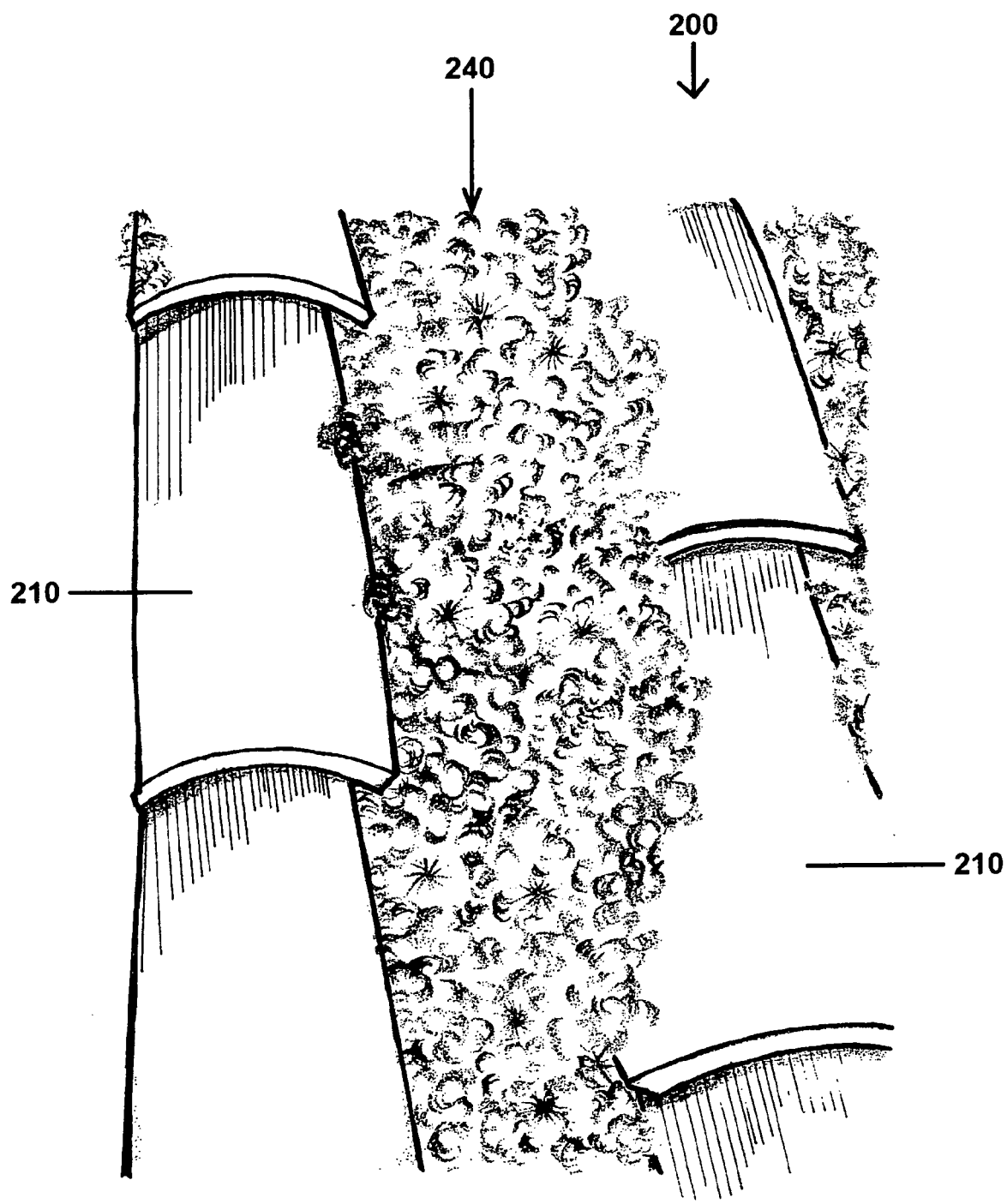
FIG. 24 is a perspective view in partial cutaway of yet another preferred embodiment of the roofing assembly of the present invention.

Yet another feature of the present invention comprises the provision of a stabilizing assembly 230 as represented in FIGS. 19 and 20. The stabilizing assembly 230 may include a plurality of elongated stabilizing structures 232 formed beneath and in aligned relation with the plurality of exposed roof tiles 210 and in engaging, at least partially supporting and/or stabilizing relation to under portions of the plurality of aligned, correspondingly disposed roofing tiles 210. In addition, the plurality of stabilizing structures 232 are disposed between the correspondingly disposed pan tiles 202 located in transversely adjacent pan tile rows. The positioning of the stabilizing structures 232 in this location serves to at least partially define or be determinative of the predetermined spacing between the rows of pan tiles thereby assuring that the plurality of exposed roof tiles 210 will be capable of appropriate, intended overlapping relation to corresponding side segments 206 of the adjacently disposed pan tiles 202. In at least one embodiment, the stabilizing structures are formed of an expanded polystyrene material.

Figure 18A:
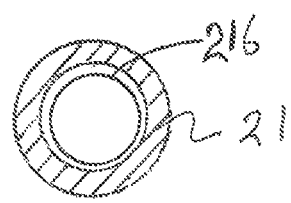
FIG. 18A is a sectional view of adhering material disposed in at least partially surrounding relation to a conduit assembly associated with a heat dissipating assembly as represented in FIG. 18.

The stabilizing assembly 230 of the present invention may also include appropriate adhering material 21 such as adhesives or a foam material including poly-foam as described above with reference to FIGS. 8-10. As generally set forth above, when utilized the adhering material 21 will serve to interconnect and secure the plurality of stabilizing structures 232 to the corresponding roof tiles 210, as also represented in FIGS. 19 and 20, as well as to the adjacently disposed pan tiles 202 and/or the side segments 206 thereof. In addition, when poly-foam or other appropriate foam-like material, such as adhering material 21, is utilized it can also cover and/or at least partially enclose the conduit assembly 216, as represented in FIG. 18A, thereby facilitating the insulation thereof and the retention of heat within the insulating fluid or water passing through the conduit assembly 216.

In order to facilitate adherence or interaction between the adhering material 21, be it poly-foam or other adhesive, the exterior surface of the various stabilizing members 232 can be structured such as being channeled or being formed somewhat irregularly, as at 232'. Therefore, the provision of the stabilizing assembly 230 at least in the form of the stabilizing members or structures 232 will add overall stability to the roofing assembly and restrict damage thereto such as by lift forces being applied to the exposed roof tiles 210 and/or damage caused by impact on the roof tiles 210.

Yet another structural and operative feature associated with the roofing tile assembly 200 is the provision of vegetation 240 by which may be disposed between the adjacently disposed rows of the roof tiles 210. Also, the vegetation 240 may be placed in overlying relation to the exposed surface of the base of associated pan tiles or between the plurality of rows of roof tiles 210 associated with different but transversely adjacent rows of pan tiles. Moreover, the vegetation 240 may be in the form of vegetated mats utilizing rock wool strips or other non-combustible, lightweight growth medium to facilitate the nutrition of the vegetation 240. In addition, while not specifically represented, the vegetation 240 and/or the system associated therewith may include a drip system secured to an appropriate part of the roof or roof assembly 200 and operative to supply sufficient water and other nutrients to the vegetation 240.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A roofing assembly disposed on an underlying support and including a plurality of exposed roof tiles, said roofing assembly comprising:
    a plurality of pan tiles; at least some of said pan tiles including a base and two oppositely disposed side segments,
    said base disposed in confronting relation to the underlying support and said two side segments extending outwardly from said base at predetermined angles,
    said plurality of pan tiles disposed in a plurality of elongated rows arranged at a predetermined spacing from one another,
    said predetermined spacing sufficient to facilitate at least some of the plurality of roof tiles being concurrently disposed in overlying relation to correspondingly disposed side segments of adjacent pan tiles of adjacent ones of said plurality of rows,
    a solar energy system comprising photovoltaic assembly disposed on an exposed surface of at least said base of at least some of said plurality of pan tiles of a common one of said plurality of rows,
    a heat dissipating assembly disposed in heat transferring relation to at least said plurality of pan tiles,
    said heat dissipating assembly comprising a conduit assembly structured to define a path of fluid flow for a heat dissipating fluid; said path of fluid flow extending along at least a majority of a length of at least one of said plurality of rows;
    a connecting assembly at least partially formed from a heat conductive material and disposed in interconnecting relation between said conduit assembly and said plurality of pan tiles, and
    said connecting assembly comprising a plurality of clips formed from a heat transferring material having sufficient heat conductivity to facilitate the transfer of heat from a corresponding one of said plurality of pan tiles to said conduit assembly and said heat dissipating fluid disposed therein; said plurality of clips structured to concurrently engage said conduit assembly and at least one of said side segments of a correspondingly disposed one of said plurality of said pan tiles.

2. A roofing assembly as recited in claim 1 wherein said conduit assembly extends along at least a majority of a length of adjacent ones of said plurality of rows of pan tiles.

3. A roofing assembly as recited in claim 1 wherein said conduit assembly is connected to and extends beneath and along a length of longitudinally adjacent ones of said plurality of pan tiles of a common one of said plurality of rows.

4. A roofing assembly as recited in claim 1 wherein said plurality of clips are disposed in spaced relation to one another along a length of said conduit assembly and in supported attachment to different ones of said plurality of pan tiles; said plurality of clips collectively disposed to locate said conduit assembly beneath the plurality of roof tiles and in heat dissipating relation with said plurality of pan tiles.

5. A roofing assembly as recited in claim 3 wherein said conduit assembly is cooperatively structured with said plurality of pan tiles to extend transversely beneath at least said common one of said plurality of rows into heat transferring relation with a next adjacent one of said plurality of rows.

6. A roofing assembly as recited in claim 5 wherein said conduit assembly is disposed beneath said common one of said plurality of rows substantially at a junction of corresponding ends of longitudinally adjacent ones of said plurality of pan tiles of said common one of said rows.

7. A roofing assembly as recited in claim 6 wherein said plurality of pan tiles are integrally connected to one another, said junction comprising a stepped portion extending transversely between said longitudinally adjacent pan tiles.

8. A roofing assembly as recited in claim 1 where an adhering material is disposed in at least partially surrounding and insulating relation to said heat dissipating assembly.

9. A roofing assembly as recited in claim 1 wherein longitudinally adjacent ones of said plurality of pan tiles, defining a common row, are integrally secured to one another in an elongated array, said plurality of longitudinally adjacent pan tiles of a common one of said plurality of rows being formed of a heat conductive, metallic material.

10. A roofing assembly as recited in claim 1 wherein said heat dissipating assembly comprises a conduit assembly structured to define a path of fluid flow for a heat dissipating fluid; said heat dissipating fluid comprising water, said conduit assembly disposed in communicating, water delivering relation with a predetermined, usable hot water supply.

11. A roofing assembly disposed on an underlying support and including a plurality of exposed roof tiles, said roofing assembly comprising:

a plurality of pan tiles; at least some of said pan tiles including a base and two oppositely disposed side segments, said base disposed in confronting relation to the underlying support and said two side segments extending outwardly from said base at predetermined angles, said plurality of pan tiles disposed in a plurality of elongated rows arranged at a predetermined spacing from one another, said predetermined spacing sufficient to facilitate at least some of the plurality of roof tiles being concurrently disposed in overlying relation to correspondingly disposed side segments of adjacent pan tiles of adjacent ones of said plurality of rows, a solar energy system comprising a photovoltaic system disposed on an exposed surface of at least said base of at least some of said plurality of pan tiles of a common one of said plurality of rows, a heat dissipating assembly disposed in heat transferring relation to at least said plurality of pan tiles, a stabilizing assembly disposed between adjacent rows of pan tiles and being disposed and dimensioned to be at least partially determinative of said predetermined spacing between said adjacent rows of pan tiles, said stabilizing assembly including at least one elongated stabilizing member extending along at least the majority of the length of said adjacent rows and beneath and in substantially longitudinal alignment with a plurality of correspondingly disposed roof tiles disposed on said adjacent rows in overlying relation to said predetermined spacing between said adjacent rows, and said stabilizing assembly further comprising an adhering material disposed in at least partially covering relation to at least a portion of said one stabilizing member, said one stabilizing member disposed in stabilizing, interconnecting relation to corresponding pan tiles of said adjacent rows and to the correspondingly disposed plurality of roof tiles.

12. A roofing assembly as recited in claim 11 wherein said stabilizing member comprises an exterior surface configuration structured to facilitate attachment of said adhering material to said stabilizing member.

13. A roofing assembly as recited in claim 11 wherein said adhering material comprises a foam material having predetermined adhesive and insulating capabilities.

14. A roofing assembly as recited in claim 13 wherein said stabilizing member comprises expanded polystyrene.

15. A roofing assembly as recited in claim 14 wherein said adhering material comprises a poly-foam material.

\* \* \* \* \*